United States Patent
Yamamoto et al.

(10) Patent No.: US 7,522,333 B2
(45) Date of Patent: Apr. 21, 2009

(54) METHOD OF PRODUCING AN ELECTROPHORETIC PARTICLE, ELECTROPHORETIC DEVICE, AND ELECTRIC APPARATUS

(75) Inventors: Hitoshi Yamamoto, Chino (JP); Takeo Kawase, Suwa (JP); Toshiyuki Miyabayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 11/379,188

(22) Filed: Apr. 18, 2006

(65) Prior Publication Data
US 2006/0245037 A1 Nov. 2, 2006

(30) Foreign Application Priority Data
Apr. 19, 2005 (JP) ............................. 2005-150120
Mar. 23, 2006 (JP) ............................. 2006-081713

(51) Int. Cl.
*G02B 26/00* (2006.01)
*G03G 13/00* (2006.01)
*G02F 1/133* (2006.01)

(52) U.S. Cl. ............................. 359/296; 430/31; 349/33
(58) Field of Classification Search ................. 359/245, 359/253–254, 265, 290–291, 296; 349/33; 345/107; 430/31–32
See application file for complete search history.

(56) References Cited
U.S. PATENT DOCUMENTS
4,268,456 A 5/1981 Keim et al.

2002/0185378 A1* 12/2002 Honeyman et al. .......... 204/601

FOREIGN PATENT DOCUMENTS

| JP | B 46-34898 | 10/1971 |
| JP | B 49-46291 | 12/1974 |
| JP | A 51-30284 | 3/1976 |
| JP | A 60-078947 | 4/1985 |
| JP | B H01-24142 | 5/1989 |
| JP | B H04-65824 | 10/1992 |

\* cited by examiner

*Primary Examiner*—Scott J Sugarman
*Assistant Examiner*—Dawayne A Pinkney
(74) *Attorney, Agent, or Firm*—Oliff & Berridge, PLC

(57) ABSTRACT

A method for producing electrophoretic particles includes dispersing particles having a charge on the surfaces thereof in an polar dispersion medium; adding a first polymerizable surfactant including a first polar group having a polarity opposite to the charge of the surfaces of the particles, a hydrophobic group, and a polymerizable group to the polar dispersion medium and mixing the liquid; adding a second polymerizable surfactant including a second polar group, a hydrophobic group, and a polymerizable group to the polar dispersion medium and emulsifying the mixture; and adding a polymerization initiator to induce polymerization reaction, thereby preparing electrophoretic particles in which the particles are coated with an organic polymer. In the method, the charge polarity and the amount of charge of the electrophoretic particles are controlled by setting the polarity of the second polar group included in the second polymerizable surfactant, and at least one condition of the number of the second polar groups in second polymerizable surfactant, the valence of the second polymerizable surfactant, and the molar amount of the second polymerizable surfactant added.

14 Claims, 10 Drawing Sheets

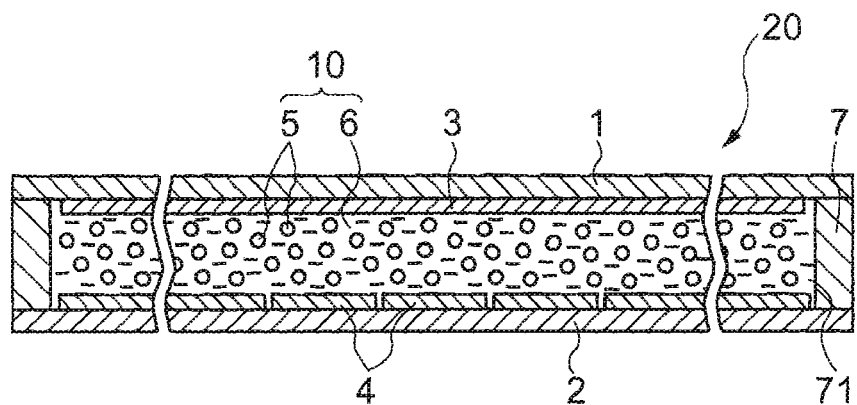
FIG. 1
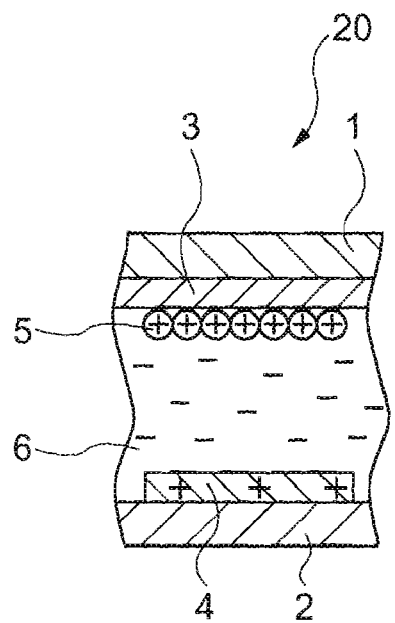 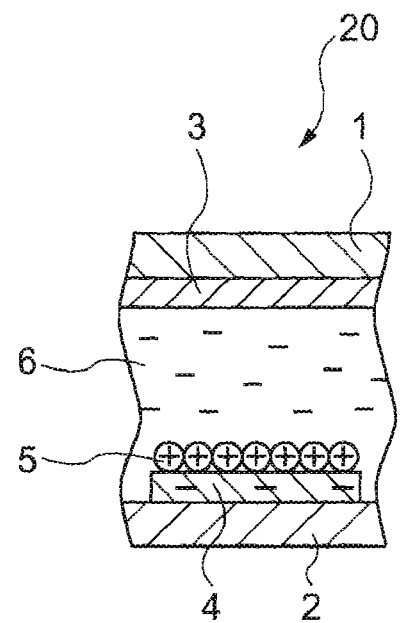
FIG. 2A          FIG. 2B

METHOD OF PRODUCING AN ELECTROPHORETIC PARTICLE, ELECTROPHORETIC DEVICE, AND ELECTRIC APPARATUS

BACKGROUND

1. Technical Field

The present invention relates to a method for producing electrophoretic particles, an electrophoretic dispersion liquid, a microcapsule, an electrophoretic device, and electric apparatus.

2. Related Art

In general, when an electric field is applied to a dispersion system prepared by dispersing fine particles in a liquid, the fine particles are moved, i.e., migrated, in the liquid by the Coulomb force. This phenomenon is known as electrophoresis. Recently, electrophoretic devices that display desired information (images) using this electrophoresis have attracted a great deal of interest as a novel display device. JP-A-2002-202534 is an example of the related art. The electrophoretic devices advantageously have a display memory property in a state where the application of voltage is stopped, and a wide viewing angle property. In addition, a display with high contrast can be achieved with low power consumption.

Furthermore, since the electrophoretic devices are nonluminous display devices, these devices are eye-friendly, compared with luminous display devices such as a display including a cathode ray tube. JP-A-2002-202534 discloses an electrophoretic device in which microcapsules containing an insulating colored liquid and charged particles therein are sandwiched between a pair of transparent electrodes. In this electrophoretic device, when a voltage is applied between the pair of transparent electrodes, the charged particles migrate in the colored liquid toward one of the electrodes according to the direction of an electric field generated between the electrodes. Consequently, an observer can see the color of the charged particles and/or the color of the colored liquid. Accordingly, desired information can be displayed by patterning at least one of the electrodes and controlling the voltage applied thereto.

In a known electrophoretic device, charged particles having a desired charge state are generally selected for use. Alternatively, particles are charged by adhering a coupling agent, a polymer, or the like on the surfaces of thereof. However, the types of the coupling agent and the polymer that can be used are limited. Therefore, in any case, it is difficult to control the charge state of the charged particles to be a desired state. This is because the charge state of particles is difficult to control. It has been desired to develop a method for easily controlling the charge state of particles to a desired state.

SUMMARY

An advantage of some aspects of the invention is that it provides a method for producing electrophoretic particles in which electrophoretic particles having a desired charge state can be easily produced, an electrophoretic dispersion liquid that is produced by the method for producing the electrophoretic particles and that contains highly reliable electrophoretic particles whose charge state is controlled, a microcapsule containing the electrophoretic dispersion liquid therein, and a highly reliable electrophoretic device and electric apparatus that include the microcapsule.

The above advantage can be achieved by the following some aspects of the invention.

According to a first aspect of the invention, a method for producing electrophoretic particles includes dispersing particles having a charge on the surfaces thereof in an polar dispersion medium, adding a first polymerizable surfactant including a first polar group having a polarity opposite to the charge of the surfaces of the particles, a hydrophobic group, and a polymerizable group to the polar dispersion medium and mixing the liquid; adding a second polymerizable surfactant including a second polar group, a hydrophobic group, and a polymerizable group to the polar dispersion medium and emulsifying the mixture; and adding a polymerization initiator to induce polymerization reaction, thereby preparing electrophoretic particles in which the particles are coated with an organic polymer. In the method, the charge polarity and the amount of charge of the electrophoretic particles are controlled by setting the polarity of the second polar group included in the second polymerizable surfactant, and at least one condition of the number of the second polar groups in the second polymerizable surfactant, the valence of the second polar group, the molecular weight of the second polymerizable surfactant, and the molar amount of the second polymerizable surfactant added.

In this case, the particles may be prepared by performing a treatment for imparting a charge to material particles.

In this case, the particles preferably include a pigment or a dye as a main material.

In this case, each of the hydrophobic groups included in the first polymerizable surfactant and the second polymerizable surfactant preferably includes at least one of an alkyl group and an aryl group.

In this case, each of the polymerizable groups included in the first polymerizable surfactant and the second polymerizable surfactant is preferably a radically polymerizable unsaturated hydrocarbon group.

The radically polymerizable unsaturated hydrocarbon group may be one selected from the group consisting of a vinyl group, an allyl group, an acryloyl group, a methacryloyl group, a propenyl group, a vinylidene group, and a vinylene group.

In this case, the second polar group included an the second polymerizable surfactant may be a cationic group, and the cationic group may be one selected from the group consisting of a primary amine cationic group, a secondary amine cationic group, a tertiary amine cationic group, and a quaternary ammonium cationic group.

In this case, the second polar group included in the second polymerizable surfactant may be an anionic group, and the anionic group may be one selected from the group consisting of a sulfonate anionic group ($—SO_3^-$), a sulfinate anionic group ($—RSO_2^-$: R represents an alkyl group having 1 to 12 carbon atoms, a phenyl group, or a modified group thereof), and a carboxylate anionic group ($—COO^-$).

According to a second aspect of the invention, an electrophoretic dispersion liquid includes at least one type of the electrophoretic particles produced by the above-described method for producing electrophoretic particles.

According to a third aspect of the invention, a microcapsule includes the above electrophoretic dispersion liquid, and a capsule body containing the electrophoretic dispersion liquid therein.

According to a fourth aspect of the invention, an electrophoretic device includes a transparent substrate, a counter substrate facing the transparent substrate, and the above electrophoretic dispersion liquid provided between the transparent substrate and the counter substrate.

According to a fifth aspect of the invention, an electrophoretic device includes a transparent substrate, a counter substrate facing the transparent substrate, and the above microcapsule provided between the transparent substrate and the counter substrate.

According to a sixth aspect of the invention, electric apparatus includes any one of the above electrophoretic device.

BRIEF DESCRIPTION OF THE DRAWINGS

The invention will be described with reference to the accompanying drawings, wherein like numbers reference like elements.

FIG. 1 is a schematic view showing a longitudinal cross section of an electrophoretic device of a first embodiment.

FIGS. 2A and 2B are schematic views showing a principle of operation of the electrophoretic device shown in FIG. 1.

DESCRIPTION OF EXEMPLARY EMBODIMENTS

Figure 3A:
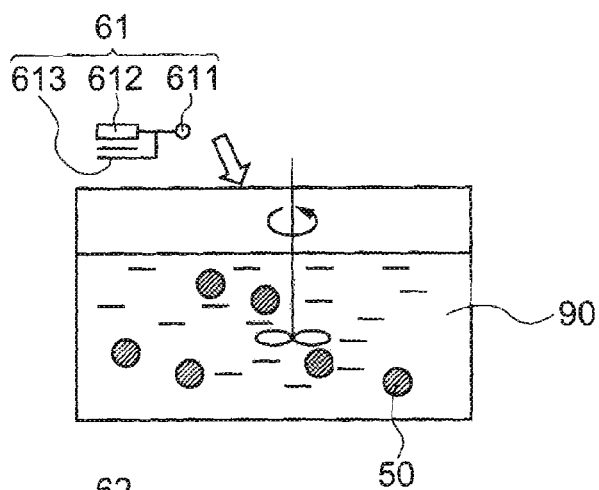
FIGS. 3A to 3D are schematic views showing a method for producing electrophoretic particles of the invention.

A method for producing electrophoretic particles, an electrophoretic dispersion liquid, a microcapsule, an electrophoretic device, and electric apparatus of the invention will now be described on the basis of preferred embodiments shown in the attached drawings.

First Embodiment

A first embodiment of an electrophoretic device of the invention will be described. FIG. 1 is a schematic view showing a longitudinal cross section of an electrophoretic device of the first embodiment. FIGS. 2A and 2B are schematic views showing a principle of operation of the electrophoretic device shown in FIG. 1. Hereinafter, for convenience of explanation, the upper side of FIGS. 1, 2A, and 2B is defined as "top" and the lower side thereof is defined to as "bottom".

An electrophoretic device 20 shown in FIG. 1 includes a first substrate 1 having a first electrode 3, a second substrate 2 having second electrodes 4 facing the first electrode 3, and an electrophoretic dispersion liquid 10 provided between the first substrate 1 and the second substrate 2. The structures of each part will be sequentially described. The first substrate 1 and the second substrate 2 are composed of sheet-shaped (flat plate) components and have a function of supporting and protecting components disposed therebetween. Each of the substrates 1 and 2 may be composed of a flexible material or a rigid material. However, each of the substrates 1 and 2 is preferably composed of a flexible material. Use of the flexible substrates 1 and 2 can realize the electrophoretic device 20 that is useful for a flexible electrophoretic device 20, e.g., electronic paper.

Examples of the material constituting such flexible substrates 1 and 2 include various thermoplastic resins such as polyolefins, e.g., polyethylene, polypropylene, and ethylene-vinyl acetate copolymers; modified polyolefins; polyamides, e.g., nylon 6, nylon 46, nylon 66, nylon 610, nylon 612, nylon 11, nylon 12, nylon 6-12, and nylon 6-66; thermoplastic polyimides; liquid crystal polymers, e.g., aromatic polyesters; polyphenylene oxide; polyphenylene sulfide; polycarbonates; polymethylmethacrylate; polyethers; polyetheretherketones; polyetherimides; polyacetals; polystyrenes; polyvinyl chlorides; polyurethanes; polyesters; polyamides, polybutadienes; trans-polyisoprenes; fluorocarbon rubbers; and chlorinated polyethylenes; and copolymers, blended polymers, and polymer alloys that are mainly composed of these thermoplastic resins. These may be used alone or as a mixture of two or more resins.

The average thickness of the substrates 1 and 2 is appropriately determined according to the material, the application, and the like, and is not particularly limited. However, when the substrates 1 and 2 have flexibility, the thickness thereof is preferably about 20 to 500 μm, more preferably about 25 to 250 μm, and further preferably about 50 to 150 μm. Thereby, the electrophoretic device 20 can be reduced in size (particularly in thickness) while the flexibility and the strength of the electrophoretic device 20 are harmonized. The lamellar (filmy) first electrode 3 and the second electrodes 4 are provided on the surfaces adjacent to the electrophoretic dispersion liquid 10, that is, on the lower surface of the first substrate 1 and the upper surface of the second substrate 2, respectively.

When a voltage is applied between the first electrode 3 and the second electrodes 4, an electric field is generated therebetween and the electric field acts on electrophoretic particles 5. In this embodiment, the first electrode 3 serves as a common electrode and the second electrodes 4 serve as individual electrodes (pixel electrodes) that are divided in a matrix shape. A part where the first electrode 3 overlaps with one of the second electrodes 4 forms a single pixel. The first electrode 3 may also be divided into a plurality of parts as well as the second electrodes 4.

The materials constituting the first electrode 3 and the second electrodes 4 are not particularly limited as long as the materials substantially have conductivity. Examples of the conductive materials include metallic materials such as copper, aluminum, nickel, cobalt, platinum, gold, silver, molybdenum, tantalum, and alloys thereof; carbon materials such as carbon black, carbon nanotubes, and fullerene; electron-conductive polymeric materials such as polyacetylene, polypyrrole, polythiophene, polyaniline, poly(p-phenylene), poly(p-phenylenevinylene), polyfluorene, polycarbazole, polysilane, and derivatives thereof; ion-conductive polymeric materials prepared by dispersing an ionic material such as NaCl, $LiClO_4$, KCl, $H_2O$, LiCl, LiBr, LiI, $LiNO_3$, LiSCN, $LiCF_3SO_3$, NaBr, NaI, NaSCN, $NaClO_4$, $NaCF_3SO_3$, KSCN, $KClO_4$, $KCF_3SO_3$, $NH_4I$, $NH_4SCN$, $NH_4ClO_4$, $NH_4CF_3SO_3$, $MgCl_2$, $MgBr_2$, $MgI_2$, $Mg(NO_3)_2$, $MgSCN_2$, $Mg(CF_3SO_3)_2$, $CaBr_2$, $CaI_2$, $CaSCN_2$, $Ca(ClO_4)_2$, $Ca(CF_3SO_3)_2$, $ZnCl_2$, $ZnI_2$, $ZnSCN_2$, $Zn(ClO_4)_2$, $Zn(CF_3SO_3)_2$, $CuCl_2$, $CuI_2$, $CuSCN_2$, $Cu(ClO_4)_2$, or $Cu(CF_3SO_3)_2$ in a matrix resin such as polyvinyl alcohol, polycarbonate, polyethylene oxide, polyvinyl butyral, polyvinylcarbazole, or vinyl acetate; and conductive oxide materials such as indium tin oxide (ITO), fluorine-doped tin oxide (FTO), tin oxide ($SnO_2$), and indium oxide (IO). These conductive materials may be used alone or in combinations of two or more materials.

Other examples of the materials constituting the first electrode 3 and the second electrodes 4 include various composite materials prepared by mixing a conductive material (conductive particles) such as gold, silver, nickel, or carbon (particles) in a non-conductive material such as a glass material, a rubber material, or a polymeric material to impart the conductivity. Specific examples of the composite materials include conductive rubbers prepared by mixing a conductive material in a rubber material; conductive adhesives and conductive paste prepared by mixing a conductive material in an adhesive composition containing an epoxy resin, a urethane resin, an acrylic resin, or the like; and conductive resins prepared by mixing a conductive material in a matrix resin such as a polyolefin, polyvinyl chloride, polystyrene, an acrylonitrile-butadiene-styrene (ABS) resin, a nylon (polyamide), an ethylene-vinyl acetate copolymer, a polyester, an acrylic resin, an epoxy resin, or a urethane resin. The average thickness of the electrodes 3 and 4 is appropriately determined according to the material, the application, and the like, and is not particularly limited. However, the thickness is preferably about 0.05 to 10 μm and more preferably about 0.05 to 5 μm.

Among the substrates 1 and 2 and the electrodes 3 and 4, a substrate and an electrode that are disposed adjacent to a display surface (in this embodiment, the first substrate 1 and the first electrode 3) are composed of a material that has a light transmissive property, that is, preferably, that is substantially transparent (clear and colorless, clear and colored, or translucent). Thereby, the state of the electrophoretic particles 5 in the electrophoretic dispersion liquid 10, which will be described below, that is, information (image) displayed on the electrophoretic device 20 can be visually recognized easily.

Each of the electrodes 3 and 4 may have the above-described single-layered structure composed of a single material. Alternatively, for example, each of the electrodes 3 and 4 may have a multilayered laminated structure prepared by sequentially laminating a plurality of materials. That is, each of the electrodes 3 and 4 may have a single-layered structure composed of ITO or a two-layer laminated structure including an ITO layer and a polyaniline layer. A spacer 7 is provided near the sides of the electrophoretic device 20 and between the first substrate 1 and the second substrate 2. The spacer 7 has a function of specifying the distance between the first electrode 3 and the second electrodes 4.

In this embodiment, the spacer 7 is provided so as to surround the periphery of the electrophoretic device 20 and also functions as a sealing component forming an enclosed space 71 between the first substrate 1 and the second substrate 2. Examples of the material constituting the spacer 7 include various resin materials such as epoxy resins, acrylic resins, urethane resins, melamine resins, and phenolic resins, and various ceramic materials such as silica, alumina, and titania. These may be use alone or combinations of two or more materials. The average thickness of the spacer 7, i.e., the distance between the first substrate 1 and the second substrate 2 (distance between the substrates), is not particularly limited, but is preferably about 10 to 500 μm and more preferably about 20 to 100 μm.

In this embodiment, the spacer 7 is provided so as to surround the periphery of the electrophoretic device 20. The structure of the spacer 7 is not limited thereto. For example, a plurality of spacers 7 may be provided near the sides of the electrophoretic device 20 with a predetermined interval. In this case, clearances between the spacers 7 may be sealed with another sealing material. Alternatively, the spacer 7 may not be provided.

The electrophoretic dispersion liquid 10 is provided (filled) in the enclosed space 71 (inner space of the cell). Thus, the electrophoretic dispersion liquid 10 is directly in contact with the first electrode 3 and the second electrodes 4. The electrophoretic dispersion liquid 10 is prepared by dispersing (suspending) at least one type of electrophoretic particles 5 in a dispersion medium 6.

The electrophoretic dispersion liquid 10 is broadly divided into a liquid in which one type of electrophoretic particles is dispersed in the dispersion medium 6 and a liquid in which plural types of electrophoretic particles having different properties are dispersed in the dispersion medium 6. Either of these dispersion liquids may be used. The electrophoretic particles 5 can be dispersed in the dispersion medium 6 by at least one of a paint shaker method, a ball mill method, a media mill method, an ultrasonic dispersion method, a stirring dispersion method, and the like.

The invention has a feature in a method for producing the electrophoretic particles 5. The electrophoretic particles 5 and the method for producing the electrophoretic particles 5 will be described in detail below. A dispersion medium having relatively high insulating property is preferably used as the dispersion medium 6. Examples of the dispersion medium include various types of water such as distilled water, pure water, ion-exchange water, and reverse osmosis (RO) water; alcohols such as methanol, ethanol, isopropanol, butanol, octanol, ethylene glycol, diethylene glycol, and glycerin; Cellosolves such as Methyl cellosolve, Ethyl cellosolve, and Phenyl cellosolve; esters such as methyl acetate, ethyl acetate, butyl acetate, and ethyl formate; ketones such as acetone, methyl ethyl ketone, diethyl ketone, methyl isobutyl ketone, methyl isopropyl ketone, and cyclohexanone; aliphatic hydrocarbons such as pentane, hexane, and octane; alicyclic hydrocarbons such as cyclohexane and methylcyclohexane; aromatic hydrocarbons such as benzene, toluene, xylene, and benzenes including a long chain alkyl group, e.g., hexylbenzene, heptylbenzene, octylbenzene, nonylbenzene, decylbenzene, undecylbenzene dodecylbenzene, tridecylbenzene, and tetradecylbenzene; halogenated hydrocarbons such as methylene chloride, chloroform, carbon tetrachloride, and 1,2-dichloroethane; heteroaromatic compounds such as pyridine, pyrazine, furan, pyrrole, thiophene, methylpyrrolidone; nitriles such as acetonitrile, propionitrile, and acrylonitrile; amides such as N,N-dimethylformamide, and N,N-dimethylacetamide; carboxylates; and other various types of oil. These may be used alone or as a mixture.

According to the invention, since the electrophoretic particles 5 having a desired charge state can be produced, the choice of the dispersion medium 6 used can be extended. Various additives such as an electrolyte; a surfactant; a charge controlling agent composed of particles of a metal soap, a resin material, a rubber material, oil, a varnish, a compound, or the like; a dispersing agent such as a titanium-based coupling agent, an aluminum-based coupling agent, and a silane-based coupling agent; a lubricant; a stabilizing agent; or the like may be added to the dispersion medium 6 (electrophoretic dispersion liquid 10) according to need.

Furthermore, a dye such as an anthraquinone dye, an azo dye, an indigold dye, a triphenylmethane dye, a pyrazolone dye, a stilbene dye, a diphenylmethane dye, a xanthene dye, an alizarin dye, an acridine dye, a quinoneimine dye, a thiazole dye, a methine dye, a nitro dye, or a nitroso dye may be dissolved in the dispersion medium 6 according to need. In the electrophoretic device 20, when a voltage is applied between the first electrode 3 and the second electrode 4, the electrophoretic particles 5 are subjected to electrophoresis toward one of the electrodes according to the electric field generated therebetween.

For example, as shown in FIG. 2A, when positively charged electrophoretic particles 5 are used and the second electrode 4 has an electropositive potential, the electrophoretic particles 5 migrate toward the first electrode 3 and are collected on the first electrode 3. Consequently, when the electrophoretic device 20 is viewed from above (the display surface side), the color of the electrophoretic particles 5 can be seen. On the other hand, as shown in FIG. 2B, when the second electrode 4 has an electronegative potential, the electrophoretic particles 5 migrate toward the second electrode 4 and are collected on the second electrode 4. Consequently, when the electrophoretic device 20 is viewed from above (the display surface side), the color of the dispersion medium 6 can be seen.

Accordingly, by appropriately setting physical properties (such as the color, positive or negative, and the amount of electric charges) of the electrophoretic particles 5, the polarity of the electrode 3 or 4, the difference in potential between the electrodes 3 and 4, and the like, desired information (image) can be displayed on the side of the display surface of the electrophoretic device 20 according to combinations of the color of the electrophoretic particles 5 and the color of the dispersion medium 6. As described above, the electrophoretic particles 5 have a structure in which particles having an electric charge on the surfaces thereof are coated with an organic polymer.

In particular, in the invention, electrical charges having a desired polarity and desired amount thereof can be imparted to the electrophoretic particles 5 by coating particles with an organic polymer. Consequently, a nonspecific adhesion (adsorption) of unnecessary (unwanted) substances on the surfaces of the electrophoretic particles 5 can be appropriately prevented. Thus, the surface potential of the electrophoretic particles 5 becomes stable to stabilize the characteristics of the electrophoresis of the electrophoretic particles 5 in the dispersion medium 6. As a result, the characteristics (display characteristics) of the electrophoretic device 20 can be further improved.

Preferably, the specific gravity of the electrophoretic particles 5 is substantially the same as that of the dispersion medium 6. In such a case, even after the application of voltage between the electrodes 3 and 4 is stopped, the electrophoretic particles 5 can be fixed at a certain position in the dispersion medium 6 for a long time. That is, the information displayed on the electrophoretic device 20 can be maintained for a long time. The average particle size of the electrophoretic particles 5 is preferably in the range of about 0.1 to 10 μm, more preferably about 0.1 to 7.5 μm, and further preferably about 0.2 to 0.5 μm.

When the average particle size of the electrophoretic particles 5 is within the above range, the aggregation of the electrophoretic particles 5 can be effectively prevented while the dispersibility of the electrophoretic particles 5 in the dispersion medium 6 is adequately maintained. The term "electrophoretic particles" generally means the following particles: The electrophoretic particles have a positive or a negative charge in a dispersion liquid. The average migration distance of the electrophoretic particles in the dispersion liquid in response to an external electric field (electrophoretic mobility) is significantly larger than that of other particles, which are not electrophoretic particles According to a method for producing electrophoretic particles of the invention, in an organic polymer containing the electrophoretic particles 5, a second polar group is disposed outside the organic polymer, i.e., at the side of an polar dispersion medium, and the charge polarity and the amount of charge of the electrophoretic particles 5 can be controlled by setting the polarity of the second polar group included in a second polymerizable surfactant and at least one condition of the number of the second polar groups in the second polymerizable surfactant, the valence of the second polar group, the molecular weight of the second polymerizable surfactant, and the molar amount of the second polymerizable surfactant added. Specifically, for example, the charge polarity and the amount of charge of the electrophoretic particles 5 can be controlled as follows.

(A) In a production process of the electrophoretic particles 5 described below, the charge polarity of the final electrophoretic particles 5 can be controlled to be positive or negative by setting the polarity of the second polar group in the second polymerizable surfactant added to be positive or negative.

(B) In the production process of the electrophoretic particles 5 described below, the amount of charge of the final electrophoretic particles 5 can be increased by increasing the number of the second polar groups in the second polymerizable surfactant added.

(C) In the production process of the electrophoretic particles 5 described below, the amount of charge of the final electrophoretic particles 5 can be increased by selecting the second polymerizable surfactant whose second polar group has a large valence.

(D) In the production process of the electrophoretic particles 5 described below, the amount of charge of the final electrophoretic particles 5 can be decreased by selecting the second polymerizable surfactant having a large molecular weight because the ratio of the polar part of the second polar group becomes smaller than that of the nonpolar part thereof.

(E) In the production process of the electrophoretic particles 5 described below, the amount of charge of the final electrophoretic particles 5 can be increased by increasing the molar amount of the second polymerizable surfactant added.

By setting the condition of (A) and at least one condition of (B), (C), (D), and (E), the electrophoretic particles 5 with large electrophoretic mobility can also be produced. Accordingly, the characteristics (display characteristics) of the electrophoretic device 20 can be further improved using such electrophoretic particles 5 with large electrophoretic mobility.

Figure 4A:
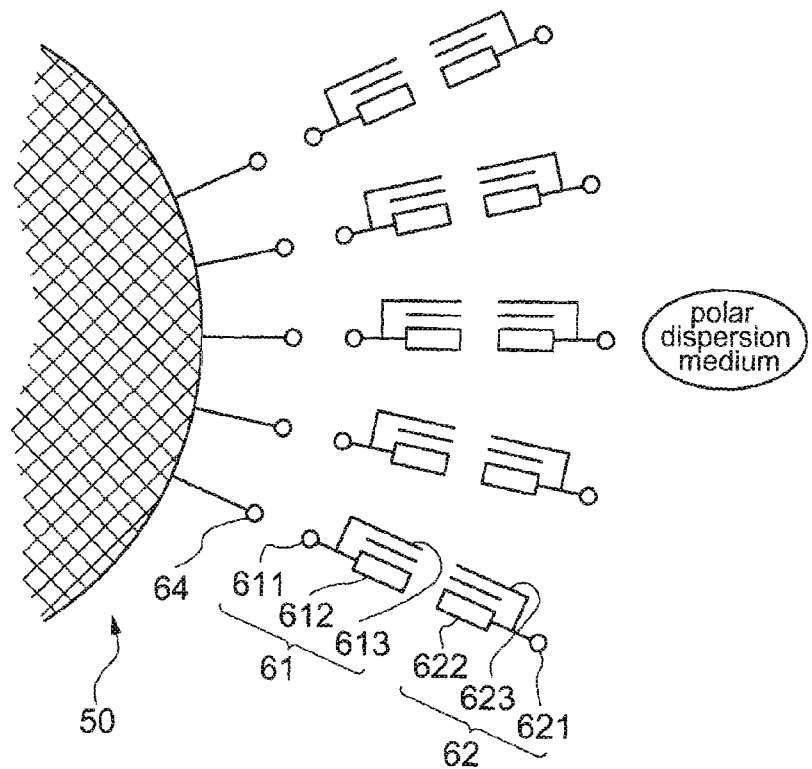
FIG. 4A is a partially enlarged view of a dispersion state of a particle that can occur in an polar dispersion medium shown in FIG. 3C.
Figure 4B:
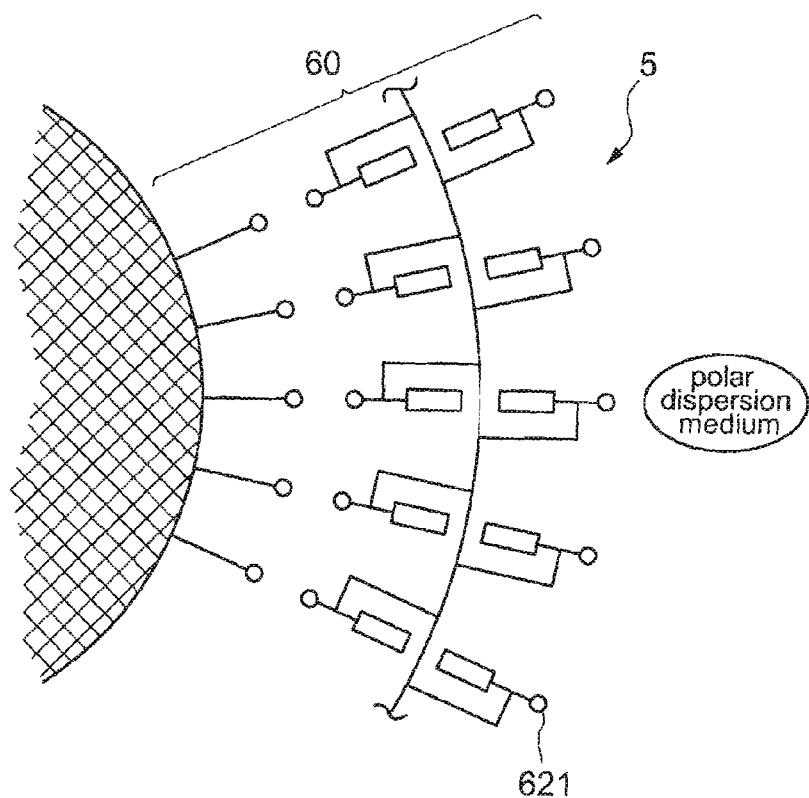
FIG. 4B is a partially enlarged view showing a configuration of an electrophoretic particle shown in FIG. 3D.
Figure 5A:
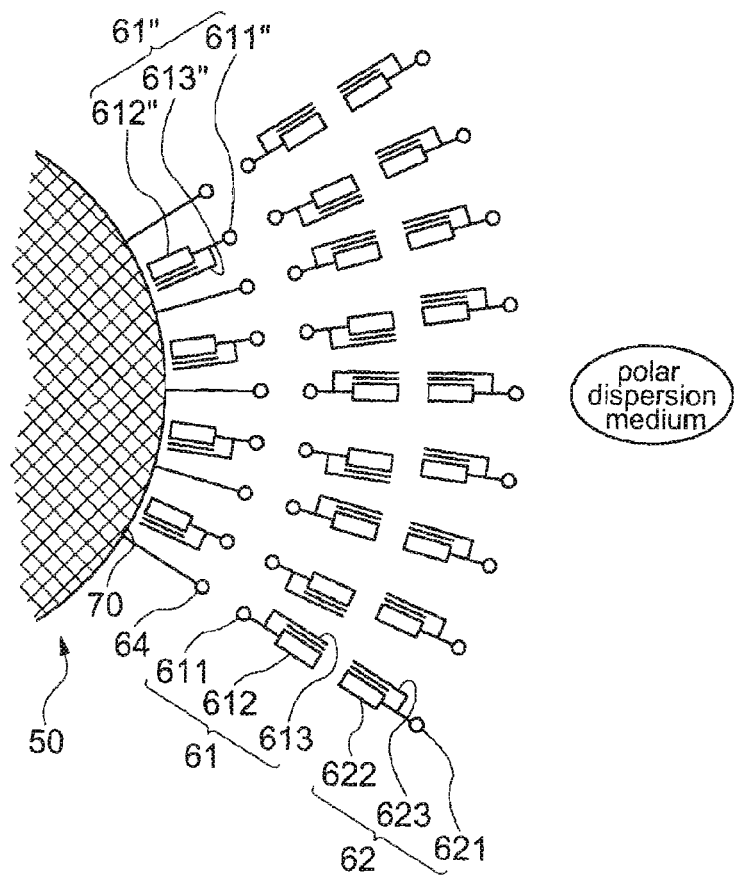
FIG. 5A is a partially enlarged view of another dispersion state of a particle that can occur in the polar dispersion medium shown in FIG. 3C.
Figure 5B:
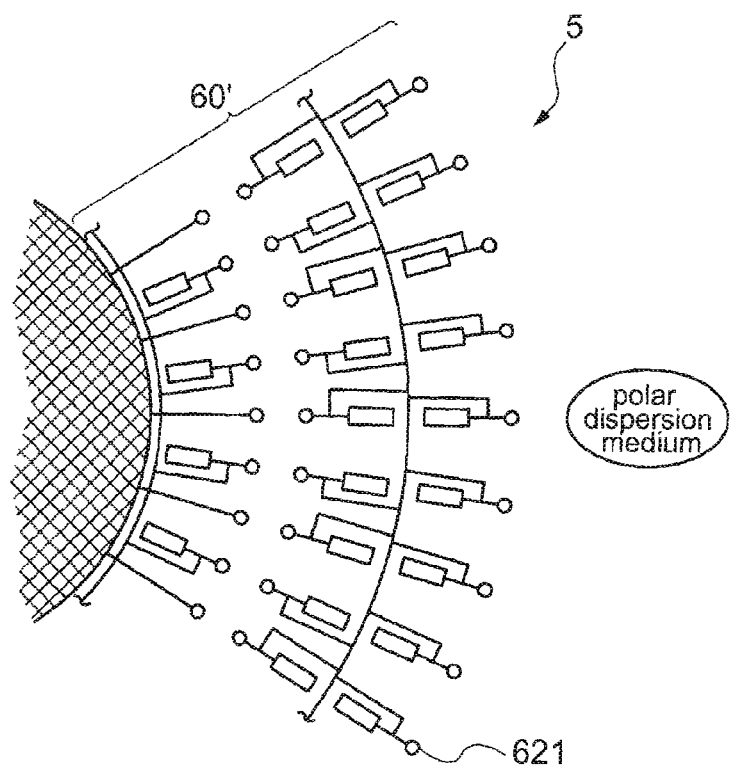
FIG. 5B is a partially enlarged view showing another configuration of an electrophoretic particle shown in FIG. 3D.

Such electrophoretic particles 5 can be produced as follows. A method for producing the electrophoretic particles 5 will now be described. FIGS. 3A to 3D are schematic views showing the method for producing electrophoretic particles of the invention. FIG. 4A is a partially enlarged views of a dispersion state of a particle that can occur in an polar dispersion medium shown in FIG. 3C, and FIG. 4B is a partially enlarged view showing a configuration of an electrophoretic particle shown in FIG. 3D. FIG. 5A is a partially enlarged view of another dispersion state of a particle that can occur in the polar dispersion medium shown in FIG. 3C, and FIG. 5B is a partially enlarged view showing another configuration of an electrophoretic particle shown in FIG. 3D.

The method for producing electrophoretic particles of the invention includes [1] dispersing particles 50 in an polar dispersion medium 90, [2] adding a first polymerizable surfactant 61 including a first polar group 611 having a polarity opposite to a charge 64 of the particles 50, a hydrophobic group 612, and a polymerizable group 613 to the polar dispersion medium 90 and mixing the liquid, [3] adding a second polymerizable surfactant 62 including a second polar group 621, a hydrophobic group 622, and a polymerizable group 623 to the polar dispersion medium 90 and emulsifying the mixture, [4] adding a polymerization initiator 80 to the polar dispersion medium 90 to induce polymerization reaction, thereby preparing electrophoretic particles 5 in which the particles 50 are coated with an organic polymer 60; [5] recovering the electrophoretic particles 5 from the polar dispersion medium 90, and [6] drying the electrophoretic particles 5.

The steps of the above method will be described with a description of dispersion states that can occur in the polar dispersion medium 90. However, the description of the dispersion states of an electrophoretic dispersion liquid described below includes a presumption.

[1] First, particles 50 having a charge 64 on the surfaces thereof are dispersed in an polar dispersion medium 90. The material constituting the particles 50 is not particularly limited as long as the particles 50 have the charge 64 on their surfaces. Examples thereof include pigments, dyes, and resins. These may be used alone or in combinations of two or more materials. For example, a resin containing a pigment or a dye can also be used. Since these materials have the charge 64 on the surface thereof, these materials have excellent dispersibility in the polar dispersion medium 90, and are suitable for the material of the particles 50.

The pigments are no particularly limited. Examples of white pigments include particles composed of inorganic pigments such as titanium oxide, barium sulfate, zinc oxide, and zinc white. Examples of yellow pigments include particles composed of inorganic pigments such as yellow iron oxide, Cadmium yellow, Titanium yellow, Chrome yellow, and lead yellow; and organic pigments including insoluble azo compounds such as Fast yellow, condensed azo compounds such as Chromophthal yellow, azo complex salts such as Benzimidazolone azo yellow, condensed polycyclic compounds such as Flavans yellow, and other compounds such as Hansa yellow, Naphthol yellow, nitro compounds, and Pigment yellow. Examples of orange pigments include particles composed of inorganic pigments such as Molybdate orange; and organic pigments including azo complex salts such as Benzimidazolone azo orange, and condensed polycyclic compounds such as Perynone orange. Examples of red pigments include particles composed of inorganic pigments such as red iron oxide and Cadmium red; and organic pigments including dyeing lakes such as Madder lake, soluble azo compounds such as Lake red, insoluble azo compounds such as Naphthol red, condensed azo compounds such as Chromophthal scarlet, condensed polycyclic compounds such as Thioindigo Bordeaux, quinacridone pigments such as Cinquacia red Y and Hostabarm red, and azo pigments such as Permanent red and Fast slow red. Examples of violet pigments include particles composed of inorganic pigments such as Manganese violet; and organic pigments including dyeing lakes such as Rhodamine lake, and condensed polycyclic compounds such as Dioxazine violet. Examples of blue pigments include particles composed of inorganic pigments such as Prussian blue, Ultramarine, Cobalt blue, and Cerulean blue; and organic pigments including phthalocyanines such as Phthalocyanine blue, indanthrenes such as Indanthrene blue, and Alkali blue. Examples of green pigments include particles composed of inorganic pigments such as Emerald green, Chrome green, chromium oxide, and Viridian; and organic pigments including azo complex salts such as Nickel azo yellow, nitroso compounds such as Pigment green and Naphthol green, and phthalocyanines such as Phthalocyanine green. Examples a black pigments include particles composed of inorganic pigments such as carbon black, titanium black, and iron black; and organic pigments such as aniline black. These pigment particles may be used alone or in combinations of two or more types of pigment. Among these pigment particles, white pigment particles, such as titanium oxide particles, and black pigment particles, such as carbon black and titanium black particles are preferred.

When titanium oxide fine particles are used, the type of titanium oxide is not particularly limited. Either the rutile type or the anatase type may be used as long as the titanium oxide fine particles are generally used as a white pigment. For example, in consideration of the color mixing of a coloring agent caused by a photocatalytic activity of titanium oxide, the rutile type, which has lower photocatalytic activity, is preferred. In order to further reduce the photocatalytic activity, titanium oxide that has been subjected to a Si treatment, an Al treatment, a Si—Al treatment, a Zn—Al treatment, or the like may be used.

Examples of the dye include, but are not limited to, as yellow dyes, azo compounds such as Oil Yellow 3G (manufactured by Orient-Chemical Industries, Ltd.); as orange dyes, azo compounds such as Fast Orange G (manufactured by BASS AG); as blue dyes, anthraquinones such as Macrolex Blue RR (manufactured bay Bayer AG); as green dyes, anthraquinones such as Sumiplast Green G (manufactured by Sumitomo Chemical Co., Ltd.); as brown dyes, azo compounds such as Oil Brown GR (a manufactured by Orient Chemical Industries, Ltd.); as red dyes, azo compounds such as Oil Red 5303 (manufactured by Arimoto Chemical Co.; Ltd.) and Oil Red 5B (manufactured by Orient Chemical Industries, Ltd.); as violet dyes, anthraquinones such as Oil Violet #730 (manufactured bay Orient Chemical Industries, Ltd.); as black dyes, azo compounds such as Sudan Black X60 (manufactured by BASF AG); and mixtures of anthraquinone-based Macrolex Blue FR (manufactured by Bayer AG) and azo-based Oil Red XO (manufactured by Kanto Chemical Co. Ltd.). These dyes may be used alone or in combinations of two or more dyes.

Examples of the resin include polyolefin polymers, poly (halogenated olefin) polymers (perhaloolefin polymer), polyester polymers, polyurethane polymers, polystyrene polymers, acrylic polymers, epoxy polymers, melamine polymers, and urea polymers. Herein, the term "polymer" means a homopolymer and copolymers prepared by polymerization of a monomer with a small amount of another copolymerizable monomer. These polymer particles may be used alone or in combinations of two or more types of polymers.

Among these, the material constituting the particles 50 preferably includes a pigment or a dye as a main component. Most of pigments and dyes have a charge on the surface thereof and they can provide various types of color. Therefore, the electrophoretic particles 5 and the electrophoretic device 20 that include such particles 50 can achieve a display with high contrast. As the polar dispersion medium 90, for example, various types of water such as distilled water, ion-exchange water, pure water, ultrapure water, and RO water may be preferably used alone or as a mixture containing water serving as a main component and a lower alcohol such as methanol or ethanol serving as a minor component.

In addition to the above-described materials, the material constituting the particles 50 may be prepared by performing a treatment for imparting a charge to material particles. In this case, in addition to the above various materials, materials that have almost no charge can also be used. Examples of this treatment include a method of allowing a compound with polarity, such as a coupling agent or a surfactant, to adsorb on the material particles.

[2] Subsequently, as shown in FIG. 3A, a first polymerizable surfactant 61 including a first polar group 611 having a polarity opposite to the charge 64 of the particles 50, a hydrophobic group 612, and a polymerizable group 613 is added to the polar dispersion medium 90 and the resulting liquid is then mixed. In this step, the molar amount of the first polymerizable surfactant 61 added is preferably in the range of 0.5 to 2 times and more preferably 0.8 to 1.2 times the total number of moles of the polar group having the charge 64 that is converted from the amount of the particles 50 used (=the weight [g] of the particles 50 used×the molar amount of the polar group having the charge 64 of the particles 50 [mol/g]). When the molar amount added is 0.5 times the total number of moles of the polar group or more, the first polymerizable surfactant 61 is ionically strongly bonded to the particles 50 having the charge 64, and thus encapsulation can be easily performed. On the other hand, when the molar amount added is 2 times the total number of moles of the polar group or less, generation of the first polymerizable surfactant 61 that is not adsorbed on the particles 50 can be suppressed, and thus generation of polymer particles that do not include line particles 50 as the core material (particles composed of only the polymer) can be prevented.

In addition, ultrasonic irradiation may be performed on the polar dispersion medium 90 for a predetermined period of time as required. This ultrasonic irradiation can accurately control the positional configuration of the first polymerizable surfactant 61 present around the particles 50. Specifically, when the particles 50 have a negative charge 64, a cationic polymerizable surfactant can be used as the first polymerizable surfactant 61. On the other hand, when the particles 50 have a positive charge 64, an anionic polymerizable surfactant can be used as the first polymerizable surfactant 61.

Cationic and anionic polymerizable surfactants that can be used in the invention will now be described in detail. Examples of a cationic group included in the cationic polymerizable surfactant include primary amine cationic groups, secondary amine cationic groups, tertiary amine cationic groups, quaternary ammonium cationic groups, quaternary phosphonium cationic groups, sulfonium cationic groups, and pyridinium cationic groups.

Among these, a cationic group selected from the group consisting of a primary amine cationic group, a secondary amine cationic group, a tertiary amine cationic group, and a quaternary ammonium cationic group is preferred. As the hydrophobic group included in the cationic polymerizable surfactant, at least one of an alkyl group and an aryl group is preferred. As the polymerizable group included in the cationic polymerizable surfactant, a radically polymerizable unsaturated hydrocarbon group is preferred.

Among radically polymerizable unsaturated hydrocarbon groups, a group selected from the group consisting of a vinyl group, an allyl group, an acryloyl group, a methacryloyl group, a propenyl group, a vinylidene group, and a vinylene group is preferred. Furthermore, among these, more preferred examples include an acryloyl group and a methacryloyl group. Examples of the cationic polymerizable surfactant include cationic allylic acid derivatives described in JP-B-4-65824. Specific examples of the cationic polymerizable surfactant include dimethylaminoethyl methacrylate methyl chloride, dimethylaminoethyl methacrylate benzyl chloride, methacryloyloxyethyltrimethylammonium chloride, diallyldimethylammonium chloride, and 2-hydroxy-3-methacryloxypropyl trimethylammonium chloride.

Commercially available products may also be used as the cationic polymerizable surfactant. Examples thereof include Acryester DMC (manufactured by Mitsubishi Rayon Co., Ltd.), Acryester DML 60 (manufactured by Mitsubishi Rayon Co., Ltd.), and C-1615 (manufactured by Dai-ichi Kogyo Seiyaku Co., Ltd.). These cationic polymerizable surfactants may be used alone or as a mixture of two or more surfactants.

Examples of an anionic group included in the anionic polymerizable surfactant include a sulfonate anionic group ($-SO_3^-$), a sulfinate anionic group ($-RSO_2^-$: R represents an alkyl group having 1 to 12 carbon atoms, a phenyl group, or a modified group thereof), and a carboxylate anionic group ($-COO^-$). One anionic group selected from the group consisting of these anionic groups is preferred. The same hydrophobic group as that included in the above cationic polymerizable surfactant may be used as the hydrophobic group included in the anionic polymerizable surfactant.

The same polymerizable group as that included in the above cationic polymerizable surfactant may be used as the polymerizable group included in the anionic polymerizable surfactant. Examples of the anionic polymerizable surfactant include anionic allyl derivatives described in JP-B-49-46291, JP-B-1-24142, and JP-A-62-104802; anionic propenyl derivatives described in JP-A-62-221431; anionic acrylic acid derivatives described in JP-A-62-34947 and JP-A-55-11525; and anionic itaconic acid derivatives described in JP-B-46-34898 and JP-A-51-30284.

Specific examples of the anionic polymerizable surfactant preferably include a compound represented by general formula (31):

[Ch. 1]

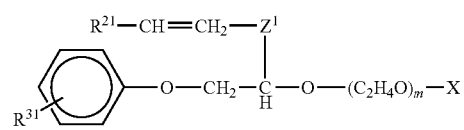

(31)

(wherein $R^{21}$ and $R^{31}$ independently represent a hydrogen atom or a hydrocarbon group having 1 to 12 carbon atoms; $Z^1$ represents a carbon-carbon single bond or a group represented by a formula $-CH_2-O-CH_2-$; m represents an integer of 2 to 20; X represents a group represented by a formula $-SO_3M^1$; and $M^1$ represents an alkali metal, an ammonium salt, or an alkanolamine) and a compound represented by general formula (32):

[Ch. 2]

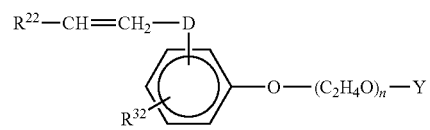

(32)

(wherein $R^{22}$ and $R^{32}$ independently represent a hydrogen atom or a hydrocarbon group having 1 to 12 carbon atoms; D represents a carbon-carbon single bond or a group represented by a formula $-CH_2-O-CH_2-$; n represents an integer of 2 to 20; Y represents a group represented by a formula $-SO_3M^2$; and $M^2$ represents an alkali metal, an ammonium salt, or an alkanolamine).

The polymerizable surfactant represented by general formula (31) is described in JP-A-5-320276 and J-A-10-316909. The amount of charge can bee controlled to the charge 64 of the particles 50 by appropriately selecting the type of $R^{21}$ and the type of X in general formula (31). Preferred examples of the polymerizable surfactant represented by general formula (31) include compounds represented by general formula (310):

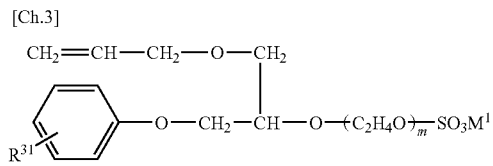

(310)

(wherein $R^{31}$, m, and $M^1$ are the same as those in the compound represented by general formula (31)). More specifically, preferred examples of the polymerizable surfactant represented by general formula (31) include compounds represented by formulae (31a) to (31d):

Adeka Reasoap SE-10N manufactured by Asabi Denka Co., Ltd. is a compound represented by general formula (310) wherein $M^1$ is $NH_4$, $R^{31}$ is $C_9H_{19}$, and m=10. Adeka Reasoap SE-20N manufactured by Asahi Denka Co., Ltd. is a compound represented by general formula (310) wherein $M^1$ is $NH_4$, $R^{31}$ is $C_9H_{19}$, and m=20.

Preferred examples of the anionic polymerizable surfactant include compounds represented by general formula (33):

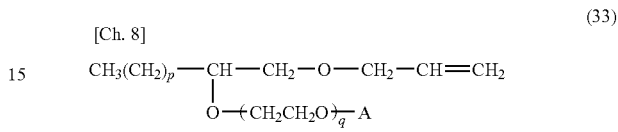

(33)

(wherein p represents 9 or 11; q represents an integer of 2 to 20; A represents a group represented by a formula —$SO_3M^3$; and $M^3$ represents an alkali metal, an ammonium salt, or an alkanolamine). Preferred examples of the anionic polymerizable surfactant represented by general formula (33) include the following compounds:

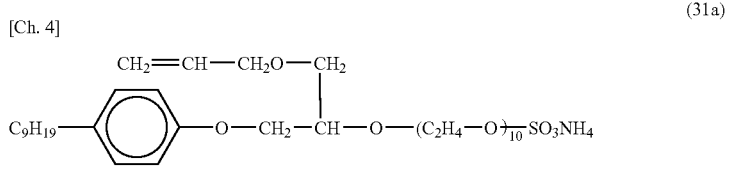

(31a)

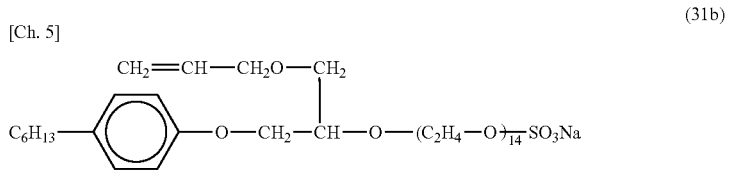

(31b)

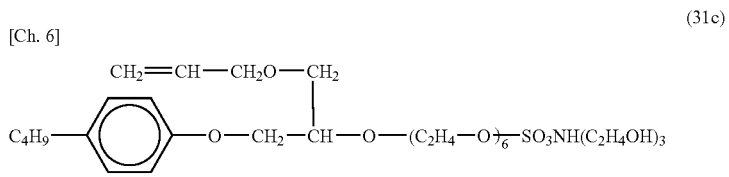

(31c)

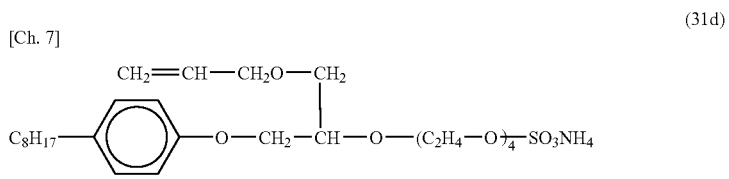

(31d)

[Ch. 9]

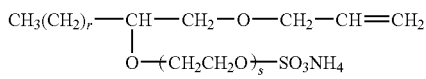

(wherein r represents 9 or 11 and s represents 5 to 10).

Commercially available products may also be used as the above anionic polymerizable surfactant. Examples thereof include Aqualon KH series manufactured by Dai-ichi Kogyo Seiyako Co., Ltd. (such as Aqualon KH-5 and Aqualon KH-10). Aqualon KH-5 is a mixture including a compound represented by the above formula wherein r is 9 and s is 5 and a compound represented by the above formula wherein r is 11 and s is 5. Aqualon KH-10 is a mixture including a compound represented by the above formula wherein r is 9 and s is 10 and a compound represented by the above formula wherein r is 11 and s is 10.

Preferred examples of the anionic polymerizable surfactant used in the invention also include compounds represented by general formula (34):

(34)

[Ch. 10]

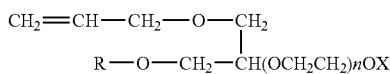

(wherein R represents an alkyl group having 8 to 15 carbon atoms; n represents an integer of 2 to 20; X represents a group represented by a formula —$SO_3B$; and B represents an alkali metal, an ammonium salt, or an alkanolamine).

Commercially available products may also be used as the above anionic polymerizable surfactant. Examples of the commercially available product include Adeka Reasoap SR series (Adeka Reasoap SR-10, SR-20, and R-1025 (trade names)) manufactured by Asahi Denka Co., Ltd. Adeka Reasoap SR series are compounds represented by general formula (34) wherein B is represented by $NH_4$ and n=10 in SR-10 and n=20 in SR-20.

Preferred examples of the anionic polymerizable surfactant also include compounds represented by general formula (A):

(A)

[Ch. 11]

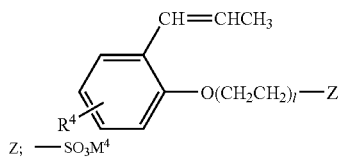

Z; —$SO_3M^4$ (wherein $R^4$ represents a hydrogen atom or a hydrocarbon group having 1 to 12 carbon atoms; l represents an integer of 2 to 20; and $M^4$ represents an alkali metal, an ammonium salt, or an alkanolamine).

Commercially available products may also be used as the above anionic polymerizable surfactant. Examples of the commercially available product include Aqualon HS series manufactured by Dai-ichi Kogyo Seiyaku Co., Ltd. (Aqualon HS-10, HS-20, and HS-1025 (trade names)).

Examples of the anionic polymerizable surfactant used in the invention also include sodium alkyl allyl sulfosuccinates represented by general formula (35):

(35)

[Ch. 12]

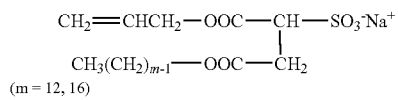

(m = 12, 16)

Commercially available products may also be used as the above anionic polymerizable surfactant. An example of the commercially available product is Eleminol JS-2 manufactured by Sanyo Chemical Industries, Ltd., which is a compound represented by general formula (35) wherein m=12.

Examples of the anionic polymerizable surfactant used in the invention also include sodium methacryloyloxypolyoxyalkylene sulfates represented by general formula (36):

(36)

[Ch. 13]

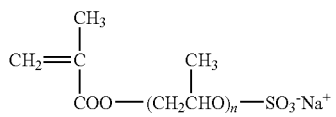

(wherein n represents an integer of 1 to 20).

Commercially available products may also be used as the above anionic polymerizable surfactant. An example of the commercially available product is Eleminol RS-30 manufactured by Sanyo Chemical Industries, Ltd., which is a compound represented by general formula (36) wherein n=9.

Examples of the anionic polymerizable surfactant used in the invention also include compounds represented by general formula (37):

(37)

[Ch. 14]

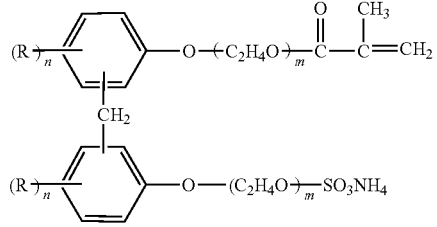

Commercially available products may also be used as the above anionic polymerizable surfactant. An example thereof is Antox MS-60 manufactured by Nippon Nyukazai Co. Ltd. The above-described anionic polymerizable surfactants may be used alone or as a mixture of two or more surfactants.

Furthermore, the organic polymer 60 preferably includes a repeating unit derived from a hydrophobic monomer. The hydrophobic monomer includes at least a hydrophobic group and a polymerizable group in its molecular structure. When such a hydrophobic monomer is contained, the hydrophobic property and the polymerizability of the organic polymer 60 can be improved. As a result, the mechanical strength and the durability of the organic polymer 60 can be improved. Examples of the hydrophobic group include at least one group selected from aliphatic hydrocarbon groups, alicyclic hydrocarbon groups, and aromatic hydrocarbon groups.

Examples of the aliphatic hydrocarbon group include a methyl group, an ethyl group, and a propyl group. Examples of the alicyclic hydrocarbon group include a cyclohexyl group, a dicyclopentenyl group, a dicyclopentanyl group, and an isobornyl group. Examples of the aromatic hydrocarbon group include a benzyl group, a phenyl group, and a naphthyl group. The polymerizable group is a radically polymerizable unsaturated hydrocarbon group and, preferably, at least one group selected from the group consisting of a vinyl group, an allyl group, an acryloyl group, a methacryloyl group, a propenyl group, a vinylidene group, and a vinylene group.

Examples of the hydrophobic monomer include monomers each having a radically polymerizable group. Specific examples thereof include styrene derivatives such as styrene, methylstyrene, dimethylstyrene, chlorostyrene, dichlorostyrene, bromostyrene, p-chloromethylstyrene, and divinylbenzene; monofunctional acrylates such as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, and isobornyl acrylate; monofunctional methacrylates such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, and isobornyl methacrylate; allyl compounds such as allylbenzene, allyl-3-cyclohexane propionate, 1-allyl-3,4-dimethoxybenzene, allyl phenoxyacetate, allyl phenylacetate, and allyl cyclohexane, allyl esters of polycarboxylic acid; esters of fumaric acid, maleic acid, and itaconic acid; N-substituted maleimides, and cyclic olefins. A monomer satisfying the above required properties is appropriately selected as the hydrophobic monomer and the amount of the hydrophobic monomer added is arbitrarily determined.

Furthermore, the organic polymer 60 preferably includes a repeating unit derived from a crosslinkable monomer and/or a repeating unit derived from a monomer represented by general formula (1).

[Ch. 15]

General formula (1)

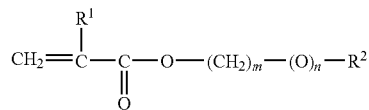

(wherein $R^1$ represents a hydrogen atom or a methyl group; $R^2$ represents a tert-butyl group, an alicyclic hydrocarbon group, an aromatic hydrocarbon group, or a heterocyclic group; m represents an integer of 0 to 3; and n represents an integer of 0 or 1).

When the organic polymer 60 includes a repeating unit derived from a crosslinkable monomer, a denser crosslinked structure can be formed in the polymer to improve the mechanical strength of the electrophoretic particles 5. When the organic polymer 60 includes a repeating unit derived from a monomer represented by general formula (1), the flexibility of the molecule of the organic polymer 60 is decreased, that is, the mobility of the molecule is constrained, by the presence of the bulky $R^2$ group. Consequently, the mechanical strength of the organic polymer 60 is improved. In addition, the presence of the bulky $R^2$ group in the organic polymer 60 provides the electrophoretic particles 5 with excellent solvent resistance. In general formula (1), specific examples of the alicyclic hydrocarbon group represented by $R^2$ include cycloalkyl groups, cycloalkenyl groups, an isobornyl group, a dicyclopentanyl group, a dicyclopentenyl group, an adamantane group, and a tetrahydrofuran group.

The crosslinkable monomer is a compound having two or more of unsaturated hydrocarbon groups at least one of which is a vinyl group, an allyl group, an acryloyl group, a methacryloyl group, a propenyl group, a vinylidene group, and a vinylene group. Specific examples thereof include ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol)adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxy-propane, 2,2-bis[4-(acryloxy)phenyl]propane, 2,2-bis[4-(acryloxyethoxy)phenyl]propane, 2,2-bis[4-(acryloxyethoxydiethoxy)phenyl]propane, 2,2-bis[4-(acryloxyethoxypolyethoxy)phenyl]propane, hydroxypivalic acid neopentyl glycol diacrylate, 1,4-butanediol diacrylate, dicyclopentanyl diacrylate, dipentaerythritol hexaacrylate, dipentaerythritol monohydroxy pentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxy pentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate, and diethylene glycol bis-allylcarbonate.

Specific examples of the monomer represented by general formula (1) include the following compounds:

[Ch. 16]

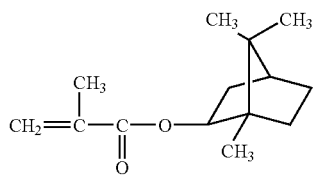

Isobornyl methacrylate

Weather resistance
Homopolymer Tg 155° C. (180° C.)

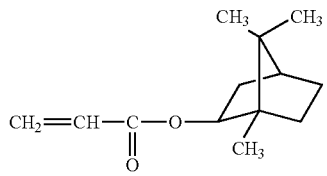

Isobornyl acrylate

Weather resistance
Homopolymer Tg 94° C.

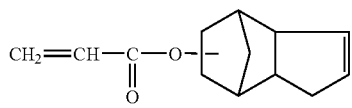

Dicyclopentenyl acrylate

Imparts adhesiveness to an acrylic resin
Homopolymer Tg 120° C.

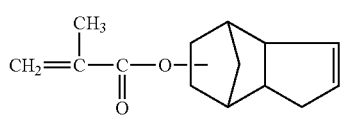

Dicyclopentenyl methacrylate

Chemical resistance

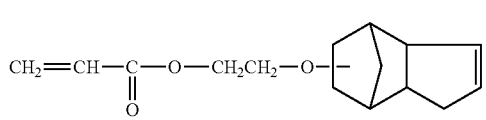

Dicyclopentenyloxyethyl acrylate レート

Imparts adhesiveness

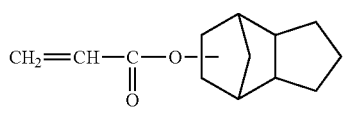

Dicyclopentanyl acrylate

Low hygroscopicity
Weather resistance
Homopolymer Tg 120° C.

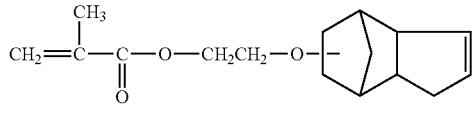

Dicyclopentenyloxyethyl methacrylate

Chemical resistance

[Ch. 17]

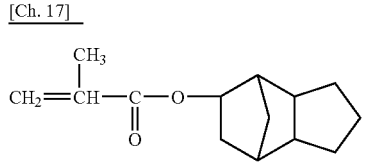

Dicyclopentanyl methacrylate

Low hygroscopicity
Weather resistance
Homopolymer Tg 175° C.

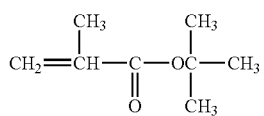

tert-Butyl methacrylate

Homopolymer Tg 107° C.

-continued

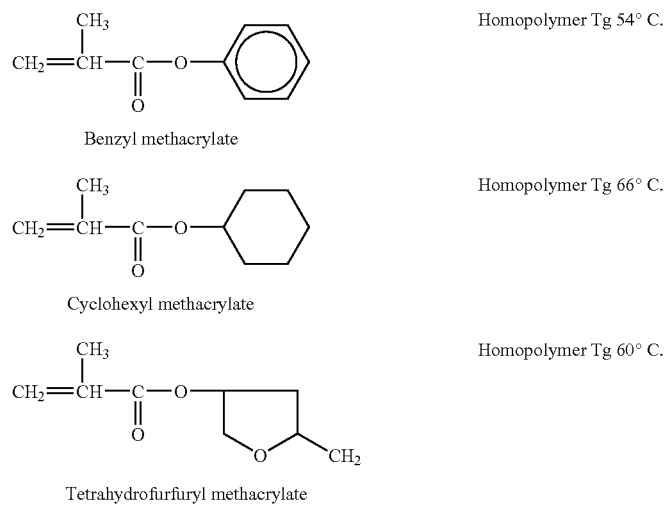

Benzyl methacrylate — Homopolymer Tg 54° C.

Cyclohexyl methacrylate — Homopolymer Tg 66° C.

Tetrahydrofurfuryl methacrylate — Homopolymer Tg 60° C.

Figure 3B:
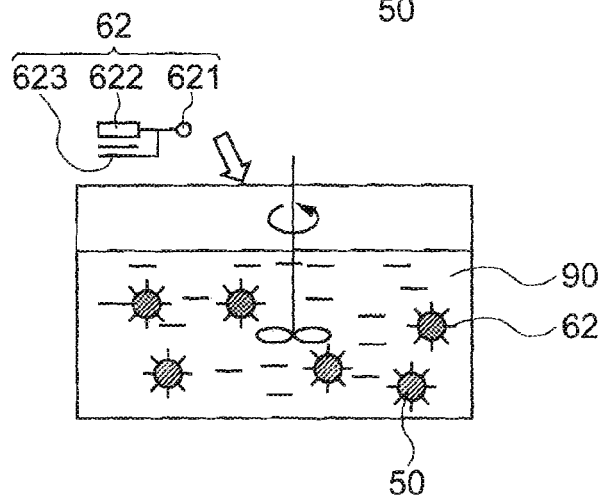
Figure 3C:
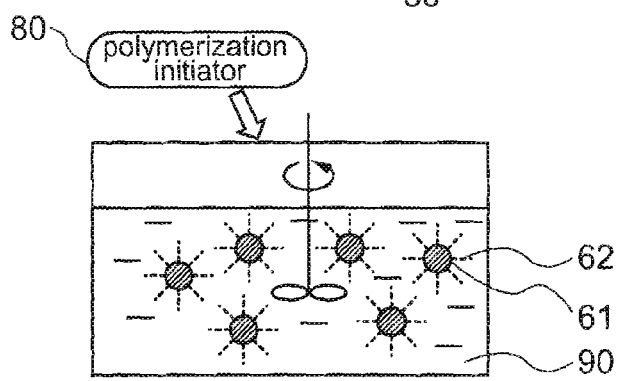

[3] Subsequently, as shown in FIG. 3B, a second polymerizable surfactant 62 including a second polar group 621, a hydrophobic group 622, and a polymerizable group 623 is added to the polar dispersion medium 90 and the resulting liquid is then emulsified. In this step, among conditions selected from (A) the polarity of the second polar group 621 included in the second polymerizable surfactant 62 added,
(B) the number of the second polar groups 621 in the second polymerizable surfactant 62,
(C) the valence of the second polar group 621,
(D) the molecular weight of the second polymerizable surfactant 62, and
(E) the molar amount of the second polymerizable surfactant 62 added, by setting condition (A) and at least one condition of (B), (C), (D), and (E), the charge polarity and the amount of charge of the final electrophoretic particles 5 can be controlled.

The molar amount of the second polymerizable surfactant 62 added is preferably in the range of about 1 to 10 times and more preferably 1 to 5 times the number of moles of the first polymerizable surfactant 61 added in step [2]. When the molar amount of the seconds polymerizable surfactant 62 added is the same as that of the first polymerizable surfactant 61 or more, the amount of charge of the electrophoretic particles 5 can be controlled more precisely and the display performance of the electrophoretic device 20 can be more improved. On the other hand, when the molar amount of the second polymerizable surfactant 62 added is 10 times the number of moles of the first polymerizable surfactant 61 or less, the generation of a hydrophilic monomer that does not contribute to the formation of the organic polymer 60 can be suppressed, and the generation of polymer particles that do not include a core material can be prevented except for the electrophoretic particles 5.

In addition, ultrasonic irradiation may be performed on the polar dispersion medium 90 for a predetermined period of time as required. This ultrasonic irradiation can accurately control the positional configuration of the second polymerizable surfactant 62 present around the particles 50. The same surfactants as those used as the first polymerizable surfactant 61 can be used as the second polymerizable surfactant 62.

Figure 3D:
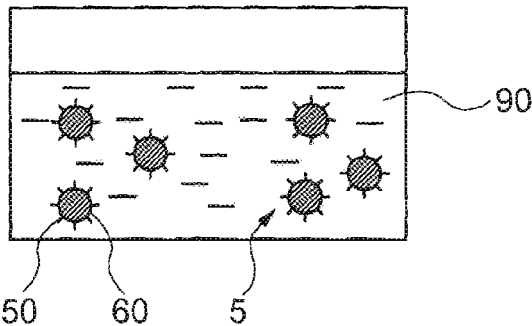

[4] Subsequently, as shown in FIG. 3C, a polymerization initiator 80 is added to the polar dispersion medium 90 to induce polymerization reaction. Consequently, as shown in FIG. 3D, the electrophoretic particles 5 in which the particles 50 are coated with the organic polymer 60 are produced. In this step, according to need, the temperature of the polar dispersion medium 90 may be increased to a predetermined temperature (the temperature at which the polymerization initiator 80 is activated). Thus, the added polymerization initiator 80 is activated and the polymerization can be preferably induced in the polar dispersion medium 90.

The polymerization initiator 80 is preferably a water-soluble polymerization initiator. Examples thereof include potassium persulfate, ammonium persulfate, sodium persulfate, 2,2-azobis-(2-methylpropioneamidine) dihydrochloride, and 4,4-azobis-(4-cyano-valeric acid). According to the emulsion polymerization conducted in the polar dispersion medium 90 described above, it is believed that the first polymerizable surfactant 61 and each monomer behave as follows. The case where a hydrophobic monomer is added in step [1] will be described below.

First, the first polymerizable surfactant 61 is adsorbed on the charge 64 of the particle 50 and ultrasonic irradiation is performed. Subsequently, a hydrophobic monomer is added, the second polymerizable surfactant 62 is added, and ultrasonic irradiation is performed. Thereby, the positional configuration of the first polymerizable surfactant 61 and the monomer that are present around the particles 50 are accurately controlled. As a result, at the outermost part, a state in which the second polar group 621 is oriented toward the polar dispersion medium 90 is formed. The monomer is then converted into the organic polymer 60 by emulsion polymerization while this accurately controlled configuration is maintained. Thus, the electrophoretic particles 5 of this embodiment are prepared.

This method can suppress the generation of water-soluble oligomers and polymers, which are by-products. Consequently, the viscosity of the polar dispersion medium 90 in which the resulting electrophoretic particles 5 are dispersed can be decreased, and thus a purification process such as ultrafiltration can be more simplified. The above polymerization reaction is preferably performed in a reactor equipped with an ultrasonic generator, a stirrer, a reflux condenser, a dropping funnel, and a temperature controller.

In the polymerization reaction, the temperature is increased to a cleavage temperature of the polymerization initiator 80 added in the reaction system (polar dispersion medium 90). Thus, the polymerization initiator 80 is cleaved to produce initiator radicals. The initiator radicals attack the unsaturated groups of the polymerizable surfactants 61 and 62 and the unsaturated group of the monomer to initiate the polymerization reaction. In order to add the polymerization initiator 80 to the reaction system, preferably, for example, an aqueous solution prepared by dissolving the water-soluble polymerization initiator 80 in pure water is added dropwise to the reactor. In this step, the aqueous solution containing the polymerization initiator 80 may be added to the polar dispersion medium 90 heated to a temperature at which the polymerization initiator 80 is activated at one time, little by little, or continuously. Alternatively, the polymerization initiator 80 may be added in advance and the polar dispersion medium 90 may then be heated to the temperature at which the polymerization initiator 80 is activated.

In the invention, as described above, preferably, a water-soluble polymerization initiator is used as the polymerization initiator 80 and an aqueous solution prepared by dissolving the polymerization initiator 80 in pure water is added dropwise in the polar dispersion medium 90 in the reactor. Thereby, the polymerization initiator 80 is cleaved to produce initiator radicals, and the initiator radicals attack the polymerizable groups of the polymerizable surfactants 61 and 62 and the polymerizable group of the polymerizable monomer to perform the polymerization reaction. The polymerization temperature and the polymerization reaction time are changed according to the type of the polymerization initiator 80 and the type of the polymerizable monomer used. However, persons skilled in the art can appropriately easily determine the polymerization conditions.

As described above, the activation of the polymerization initiator 80 in the reaction system can be preferably performed by increasing the temperature of the polar dispersion medium 90 to a predetermined polymerization temperature. The polymerization temperature is preferably in the range of 60° C. to 90° C. The polymerization time is preferably 3 to 10 hours. The electrophoretic particles 5 prepared by this process have a structure in which the particles 50 are coated with the organic polymer 60.

An example of the behavior of the polymerizable surfactants and the monomers in the process for producing the above electrophoretic particles 5 will now be described in more detail on the basis of FIGS. 4A and 4B. When the first polymerizable surfactant 61 is added to the polar dispersion medium 90, the charge 64 of the particle 50 is ionically bonded to the first polar group 611 of the first polymerizable surfactant 61. The polarities of both components are cancelled out because the bonded components have polarities that are opposite with respect to each other. The first hydrophobic group 612 of the first polymerizable surfactant 61 and the second hydrophobic group 622 of the second polymerizable surfactant 62 face each other, and the second polar group 621 of the second polymerizable surfactant 62 is oriented toward the polar dispersion medium 90 to form a micelle-like structure shown in FIG. 4A. When polymerization reaction is induced in this state, the organic polymer 60 shown in FIG. 4B is formed in which the above-described structure is maintained on the surface of the particle 50. That is, the positional configuration of the polymerizable surfactants 61 and 62 present around the particle 50 before polymerization reaction is accurately controlled. Subsequently, the polymerizable surfactants 61 and 62 and the monomers are converted into the organic polymer 60 by emulsion polymerization reaction while this accurately controlled configuration is maintained. Accordingly, the electrophoretic particles 5 produced by the method for producing electrophoretic particles of the invention have an accurately controlled structure.

An example of another behavior of the polymerizable surfactants and the monomers will now be described on the basis of FIGS. 5A and 5B. As shown in FIG. 5A, the first polar group 611 of the first polymerizable surfactant 61 is oriented toward the particle 50 having a negative charge 64 and is adsorbed on the particle 50 with a strong ionic bond. In addition, the hydrophobic group 622 and the polymerizable group 623 of the second polymerizable surfactant 62 face the hydrophobic group 612 and the polymerizable group 613 of the first polymerizable surfactant 61, respectively, by a hydrophobic interaction. The second polar group 621 is directed in a direction in which the polar dispersion medium 90 is present, that is, in a direction away from the particle 53.

The surface of the particle 50 has not only the negative charge 64 chemically bonded with a specific density but also a hydrophobic area 70 disposed between the negative charges 64. A hydrophobic group 612" and a polymerizable group, 613" of another first polymerizable surfactant 61" face the hydrophobic area 70. In addition, the second polymerizable surfactant 62 is disposed so that the second polar group 621 faces a first polar group 611" of the other first polymerizable surfactant 61". The hydrophobic groups 622 and the polymerizable groups 623 of the second polymerizable surfactant 62 face the hydrophobic groups 612 and 612" and the polymerizable groups 613 and 613" of the first polymerizable surfactant 61 and 61", respectively, by a hydrophobic interaction. The second polar group 621 is directed in a direction in which the polar dispersion medium 90 is present, that is, in a direction away from the particle 50.

When, for example, the polymerization initiator 80 is added to the polar dispersion medium 90 in the above dispersion state, the polymerizable groups 613 and 613" of the first polymerizable surfactants 61 and 61", respectively, and the polymerizable group 623 of the second polymerizable surfactant 62 are polymerized. Thus, as shown in FIG. 5B, the electrophoretic particle 5 in which the particle 50 is coated with an organic polymer 60' is prepared. According to the polymerizable surfactants 61 and 62, the charge 64 of the particle 50 is ionically bonded to the first polar group 611 of the first polymerizable surfactant 61, a micelle-like structure in which the second polar group 621 of the second polymerizable surfactant 62 is oriented toward the polar dispersion medium 90 at the outermost part is then formed in the polymerization system, and the organic polymer 60 is formed by polymerization reaction. Therefore, the positional configuration of the monomers present around the particle 50 before emulsion polymerization affects the polarization state around the particle 50 after polymerization. Thus, the polarization state can be controlled with an extremely high precision. As a result, the final electrophoretic particle 5 has the second polar group 621 at the outermost part thereof, has a charge polarity that depends on the polarity of the second polar group 621, and has an amount of charge that depends on the number of the second polar groups 621 in the second polymerizable surfactant 62, the valence of the second polar group 621, the molecular weight of the second polymerizable surfactant 62, and the molar amount of the second polymerizable surfactant 62 added. That is, the charge polarity and the amount of charge of the electrophoretic particle 5 can be controlled by setting these factors.

In the polymerization reaction, each of the polymerizable surfactants, the hydrophobic monomer, the crosslinkable monomer, the compound represented by general formula (1), and another known polymerizable monomer may be used alone or in combinations of two or more compounds. Since the emulsion polymerization reaction is performed using ionic polymerizable surfactants, in most cases, the emulsion state of the mixture containing the material monomer is satisfactory even without using an emulsifier. Therefore, use of an emulsifier is not essential. However, according to need, at least, one known emulsifier selected from the group consisting of anionic, nonionic, and cationic emulsifiers may be used.

An example of a possible dispersion state of polymerizable surfactants will now be described on the basis of FIGS. 11 and 12. In this example, titanium oxide particles that have been subjected to a Si treatment are used as particles 50, the compound represented by formula (31b) is used as polymerizable surfactants 61 and 61', and a solution prepared by dissolving hydrogen chloride in water (hydrochloric acid) is used as the dispersion medium of an polar dispersion medium 90.

Figure 11:
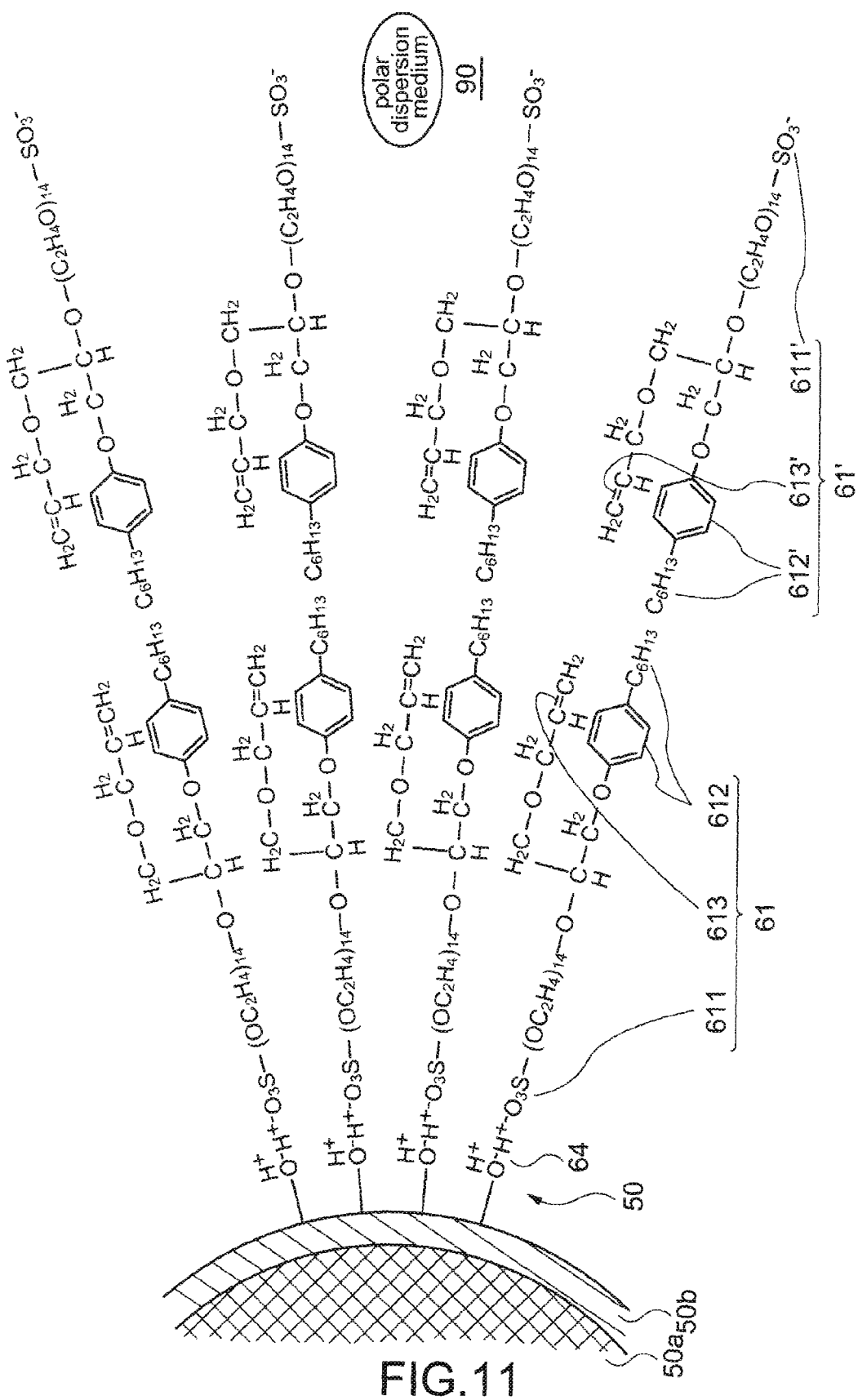
FIG. 11 is a partially enlarged view of a dispersion state of a particle that can occur in the polar dispersion medium shown in FIG. 3C.
Figure 12:
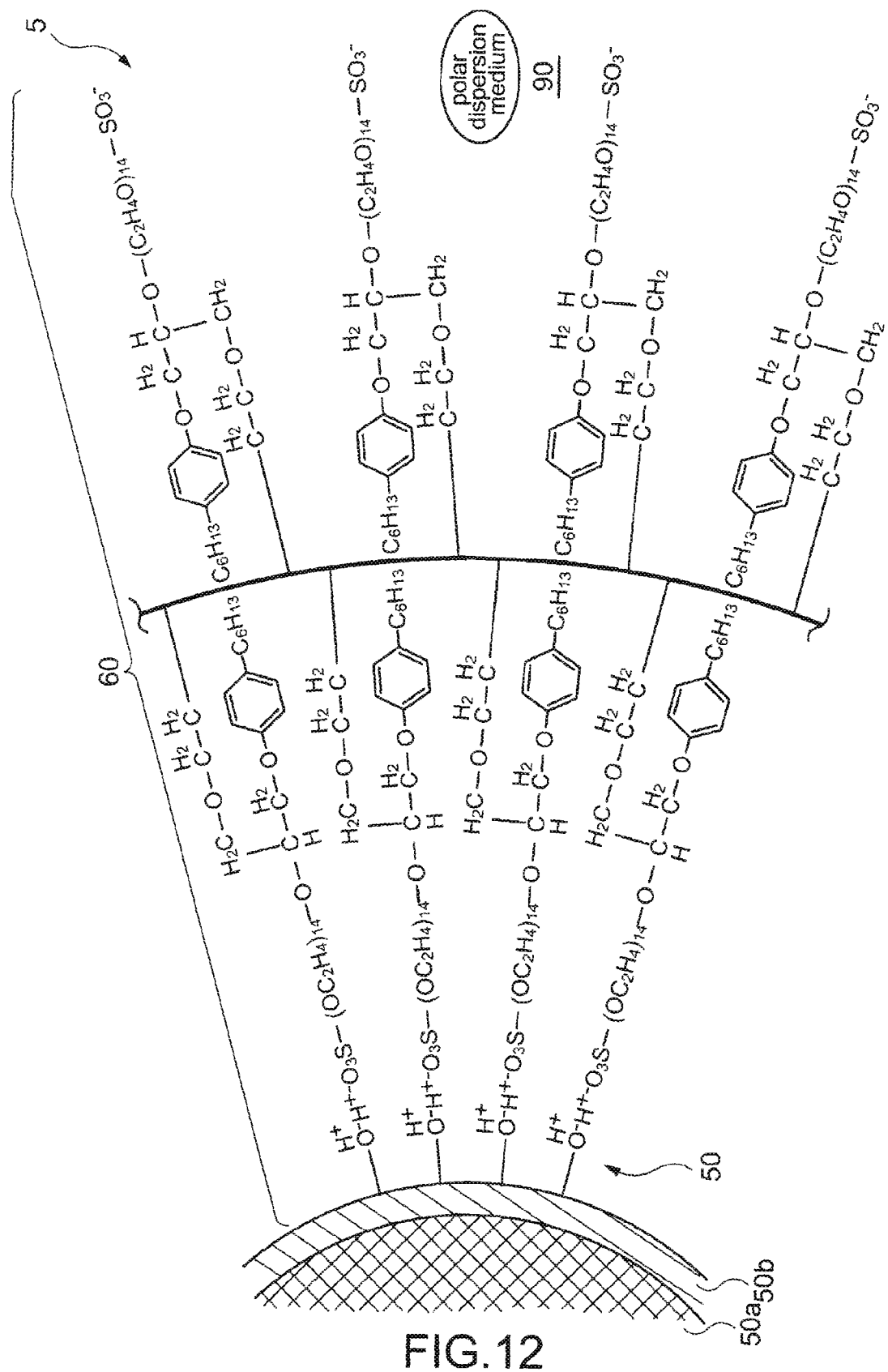
FIG. 12 is a partially enlarged view showing a structure of an electrophoretic particle shown in FIG. 3D.

FIG. 11 is a partially enlarged view of a dispersion state of a particle that can occur in the polar dispersion medium shown in FIG. 3C, and FIG. 12 is a partially enlarged view showing a structure of an electrophoretic particle shown in FIG. 3D. The particle 50 shown in FIG. 11 includes a material particle 50a composed of titanium oxide and a silicon oxide ($SiO_2$) layer 50b covering the surface of the material particle 50a. Oxygen (O) atoms bonded to silicon (Si) atoms of silicon oxide and hydrogen (H) atoms covalently bonded to the oxygen atoms, i.e., hydroxyl groups (—OH), are exposed on the surface of the silicon oxide layer 50b. The polymerizable surfactants 61 and 61' include polar groups 611 and 611', hydrophobic groups 612 and 612', and polymerizable groups 613 and 613', respectively. Herein, the chemical formula of the polymerizable surfactant represented by formula (31b) is simply expressed as $XSO_3Na$ wherein X represents the hydrocarbon part other than $SO_3Na$.

When the particles 50 and the polymerizable surfactants 61 and 61' are added to the dispersion medium of the polar dispersion medium 90, the following reactions occur:

(a)

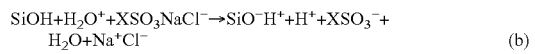

(b)

The generated proton ($H^+$) forms a coordinate bond with an O atom of a hydroxyl group bonded to a Si atom of silicon oxide. This proton and the H atom in the hydroxyl group provide a positive charge 64 on the surface of the particle 50. In addition, $XSO_3Na$ is ionized in the polar dispersion medium 90 to produce a sulfonic group (polar group 611). This sulfonic group and the positive charge 64 are oriented by an electrostatic force so as to face each other. Furthermore, a plurality of adjacent alkylphenyl groups (hydrophobic groups 612) aggregate with each other. Because of these behaviors of the groups, the polymerizable surfactant 61 is oriented so as to cover the surface of the particle 50 to form ionic bonds.

Furthermore, another polymerizable surfactant 61' (second polymerizable surfactant) having the hydrophobic group 612' is oriented outside the alkylphenyl group (hydrophobic group 612) of the polymerizable surfactant 61 (first polymerizable surfactant) forming the ionic bonds so that the hydrophobic group 612 faces the hydrophobic group 612'. Consequently, a micelle-like structure shown in FIG. 11 is formed.

When a polymerization initiator is added to the polar dispersions medium 90 in such a dispersion state, polymerization reaction occurs between the polymerizable groups 613 and 613' of the adjacent polymerizable surfactants 61 and 61', respectively. An example of polymerization reaction in which ammonium persulfate is used as the polymerization initiator will be described in detail. When ammonium persulfate is added to the polar dispersion medium 90, an oxygen-oxygen (O—O) bond in ammonium persulfate is cut to produce a radical. This radial is reacted with one of shared electron pairs serving as π-electrons of each of the vinyl groups (polymerizable groups 613 and 613') in the polymerizable surfactants 61 and 61'. Thereby, the other π-electron becomes an unpaired electron to produce a radical. This radical is reacted with a π-electron of an adjacent vinyl group and newly produces a radical, thus forming a crosslinked structure between the polymerizable surfactants 61 and 61'. Such a reaction successively proceeds as a chain reaction, thereby polymerizing the vinyl groups. As a result, the organic polymer 60 that covers the surface of the particle 50 is formed, and thus the electrophoretic particles 5 are obtained.

[5] Subsequently, the electrophoretic particles 5 are recovered from the polar dispersion medium 90 according to need. Examples of the recovering method include various filtration methods such as ultrafiltration, nanofiltration, microfiltration, cake filtration, and reverse osmosis. These methods may be employed alone or in combinations of two or more methods. In particular, ultrafiltration is preferably employed. Ultrafiltration is a method of filtering fine particles and is preferably employed as the method of filtering the electrophoretic particles 5.

[6] Subsequently, the electrophoretic particles 5 are dried according to need. Examples of the method of drying the electrophoretic particles 5 include various drying methods such as freeze drying, through-flow drying, surface drying, fluidized drying, flash drying, spray drying, vacuum drying, infrared drying, high-frequency drying, ultrasonic drying, and pulverizing drying. Among these, freeze drying is preferred. In freeze drying, since the drying is performed by sublimating the polar dispersion medium 90 from a solid to a gas, the organic polymer 60 can be dried without significantly affecting the original shape, the function, and the like of the organic polymer 60 included in the electrophoretic particles 5.

A method for freeze-drying the electrophoretic particles 5 will now be described. First, the electrophoretic particles 5 separated from the polar dispersion medium 90 by filtration are frozen by cooling. Consequently, the polar dispersion medium 30 contained in the electrophoretic particles 5 is solidified. The cooling temperature is not particularly limited as long as the temperature is the freezing point of the polar dispersion medium 90 or lower. The cooling temperature is preferably about −100° C. to −20° C. and more preferably about −80° C. to −40° C. When the cooling temperature is higher than the above temperature range, the polar dispersion medium 90 may not be satisfactorily solidified. On the other hand, even when the cooling temperature is lower than the above temperature range, further solidification of the polar dispersion medium 90 does not proceed.

Subsequently, the ambient pressure of the frozen electrophoretic particles 5 is reduced. Thus, the boiling point of the polar dispersion medium 90 can be decreased to sublimate the polar dispersion medium 90. The pressure during pressure reduction depends on the composition of the polar dispersion medium 90, but is preferably about 100 Pa or lower and more preferably about 10 Pa or lower. When the pressure during pressure reduction is within the above range, the polar dispersion medium 90 can be sublimated more reliably.

As the polar dispersion medium 90 sublimes, the ambient pressure of the electrophoretic particles 5 increases. Therefore, preferably, air is continuously exhausted with an exhaust pump or the like so that the pressure is kept constant. Thus, an increase in the pressure is suppressed and a decrease in the efficiency of sublimation of the polar dispersion medium 90 can be prevented. Thus, the freeze drying of the electrophoretic particles 5 can be performed.

Second Embodiment

Figure 6:
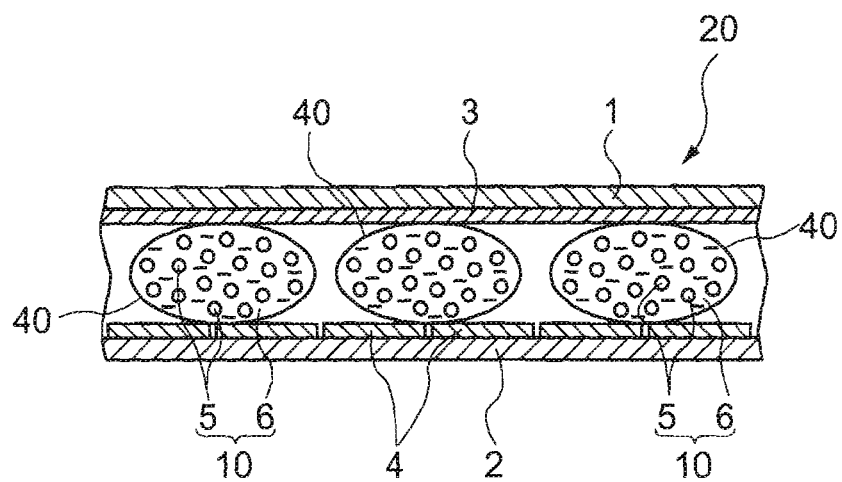
FIG. 6 is a schematic view showing a longitudinal cross section of an electrophoretic device of a second embodiment.

A second embodiment of an electrophoretic device will now be described. FIG. 6 is a schematic view showing a longitudinal cross section of an electrophoretic device of the second embodiment. Hereinafter, for convenience of explanation, the upper side of FIG. 6 is defined as "top" and the lower side thereof is defined as "bottom". The electrophoretic device of the second embodiment will be described below. The difference between the electrophoretic device of the second embodiment and that of the first embodiment is mainly described and structures common to the second embodiment and the first embodiment are not described.

As shown in FIG. 6, in an electrophoretic device 20 of the second embodiment, a plurality of microcapsules 40 each including an electrophoretic dispersion liquid 10 are disposed between a first electrode 3 and second electrodes 4, and a binder 41 is provided on the outer surfaces of the microcapsules 40. Other structures are the same as those of the electrophoretic device 20 of the first embodiment. The microcapsules 40 are disposed between a transparent substrate 1 and a counter substrate 2 (between a gap formed by the reverse surface of the transparent substrate 1 and the surface of the counter substrate 2) so that the microcapsules 40 are arranged as a single layer, that is, each microcapsule 40 does not overlap in the thickness direction. Each of the microcapsules 40 is in contact with the first electrode 3 and the second electrode 4. In this embodiment, a single microcapsule 40 is disposed on two adjacent second electrodes 4. That is, each of the microcapsules 40 is disposed so as to bridge two adjacent second electrodes 4. Examples of the material constituting the microcapsule 40 include, but are not limited to, a composite material of gum arabic and gelatin; and various resin materials such as urethane resins, melamine resins, urea resins, epoxy resins, polyamides, and polyethers. These may be used alone or in combinations of two or more materials.

A method for preparing the microcapsules 40 (a method for charging the electrophoretic dispersion liquid 10 into the microcapsules 40) is not particularly limited. Examples thereof include various methods of microencapsulation such as an interfacial polymerization method, an in-situ polymerization method, a phase separation method (or a coacervation method), an interfacial precipitation method, and a spray drying method. The method of microencapsulation may be appropriately selected according to the material constituting the microcapsules 40 and the like.

The microcapsules 40 preferably have a uniform size (average particle size). Thereby, the electrophoretic device 20 can achieve better display performance. The microcapsules 40 having a uniform size can be produced by, for example, a filtration method or a classification method based on the difference in specific gravity. The average particle size of the microcapsules 40 is not particularly limited, but is usually about 10 to 150 μm and more preferably about 20 to 100 μm. The microcapsules 40 include the electrophoretic dispersion liquid 10 therein.

The binder 41 is provided, for example, in order to fix the microcapsules 40 and to ensure the insulation between the electrodes 3 and 4. Thereby, the curability and the reliability of the electrophoretic device 20 can be further improved. A resin material having excellent affinity (adhesiveness) for the electrodes 3 and 4 and the microcapsules 40 and having excellent insulating property is preferably used for the binder 41.

Examples of the resin material include, but are not limited to, thermoplastic resins such as polyethylene, chlorinated polyethylene, ethylene-vinyl acetate copolymers, ethylene-ethyl acrylate copolymers, polypropylene, ABS resins, methyl methacrylate resins, vinyl chloride resins, vinyl chloride-vinyl acetate copolymers, vinyl chloride-vinylidene chloride copolymers, vinyl chloride-acrylate copolymers, vinyl chloride-methacrylate copolymers, vinyl chloride-acrylonitrile copolymers, ethylene-vinyl alcohol-vinyl chloride copolymers, propylene-vinyl chloride copolymers, vinylidene chloride resins, vinyl acetate resins, polyvinyl alcohol, polyvinyl formal, and cellulose-based resins, polymers such as polyamide resins, polyacetals, polycarbonates, polyethylene terephthalate, polybutylene terephthalate, polyphenylene oxides, polysulfones, polyamide-imides, polyaminobismaleimide, polyethersulfones, polyphenylene sulfones, polyarylates, grafted polyphenylene ethers, polyetheretherketones, and polyetherimides; fluorocarbon resins such as polytetrafluoroethylene, polyfluoroethylenepropylene, ethylene-tetrafluoroethylene copolymers, polyvinylidene fluoride, polytrifluoroethylene chloride, and fluorocarbon rubbers; silicon-containing resins such as silicone resins and silicone rubbers; methacrylic acid-styrene copolymers; polybutylene; and methyl methacrylate-butadiene-styrene copolymers. These may be used alone or in combinations of two or more resins.

Preferably, the dielectric constant of the binder 41 is substantially the same as that of the dispersion medium 6. For this purpose, a dielectric-constant-adjusting agent such as an alcohol, e.g., 1,2-butanediol or 1,4-butanediol; a ketone; or a carboxylate is preferably added to the binder 41. The electrophoretic device 20 of the second embodiment can also provide the same operation and advantages as those in the first embodiment.

Third Embodiment

Figure 7:
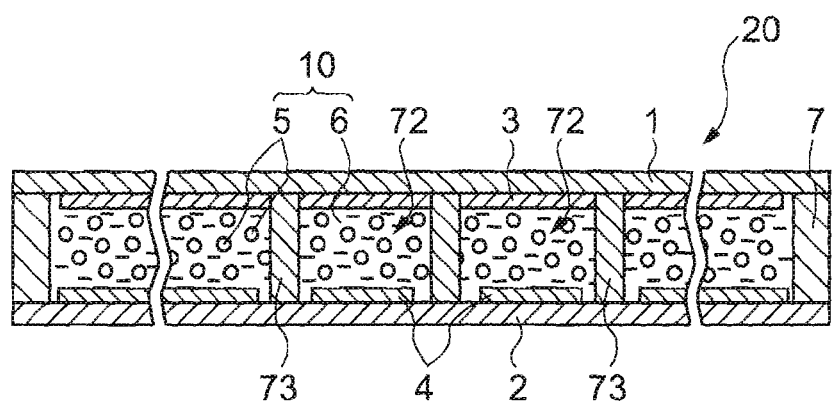
FIG. 7 is a schematic view showing a longitudinal cross section of an electrophoretic device of a third embodiment.

A third embodiment of an electrophoretic device will now be described. FIG. 7 is a schematic view showing a longitudinal cross section of an electrophoretic device of the third embodiment. The electrophoretic device of the third embodiment will be described below. The difference between the electrophoretic device of the third embodiment and those of the first and second embodiments is mainly described and structures common to the third embodiment and the first and second embodiments are not described.

As shown in FIG. 7, an electrophoretic device 20 of the third embodiment includes partitions 73 that are provided between second electrodes 4, i.e., individual electrodes, divided into a matrix shape and that divide an enclosed space 71 into smaller spaces 72; and an electrophoretic dispersion liquid 10 provided in the spaces 72. Other structures are the same as those of the electrophoretic device 20 of the first embodiment. The electrophoretic device 20 of the third embodiment can also provide the same operation and advantages as those in the first and second embodiments.

Fourth Embodiment

Figure 8:
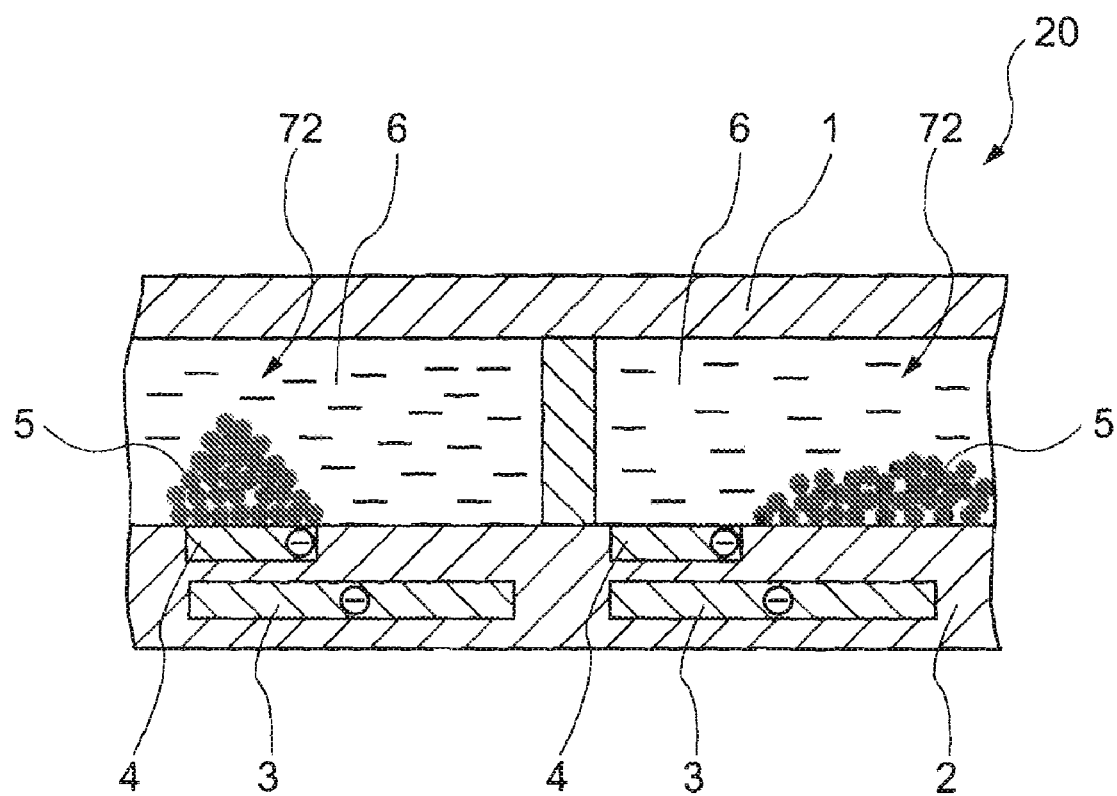
FIG. 8 is a schematic view showing a longitudinal cross section of an electrophoretic device of a fourth embodiment.

A fourth embodiment of an electrophoretic device will now be described. FIG. 8 is a schematic view showing a longitudinal cross section of an electrophoretic device of the fourth embodiment. Hereinafter, for convenience of explanation, the upper side of FIG. 8 is defined as "top" and the lower side thereof is defined as "bottom". The electrophoretic device of the fourth embodiment will be described below. The difference between the electrophoretic device of the fourth embodiment and those of the first, second, and third embodiments is mainly described and structures common to the fourth embodiment and the first, second, and third embodiments are not described.

An electrophoretic device 20 of the fourth embodiment is the same as the electrophoretic device 20 of the third embodiment except for the structure (the arrangement and the like) of first electrodes 3 and second electrodes 4. As shown in FIG. 8, in the fourth embodiment, the first electrodes 3 having a size larger than that of the second electrodes 4 are provided in a second substrate 2 so as to overlap with the second electrodes 4. In this embodiment, the case where negatively charged black (colored) electrophoretic particles 5 are used, in which the second substrate 2 is white and the second electrodes 4 are black (colored), will be described as an example. In this electrophoretic device 20, when the second electrodes 4 have an electropositive potential, the electrophoretic particles 5 are moved toward the second electrodes 4 and then collected on the second electrodes 4. On the other hand, when the second electrodes 4 have an electronegative potential, the electrophoretic particles 5 are moved toward the first electrodes 3 exposed from the second electrodes 4 and then collected thereon.

Accordingly, as shown in FIG. 8, when the electrophoretic device 20 is viewed from above (the display surface side), each pixel is perceived as follows according to combinations of the polarities of the second electrodes 4. In the left space 72, the left side can be seen as black because of the color of the electrophoretic particles 5 and the right side can be seen as white because of the color of the second substrate 2. In the right space 72, black can be seen as a whole because of the color of the electrophoretic particles 5 and the color of the second electrode 4.

Furthermore, in this electrophoretic device 20, even after the electrical conduction to the first electrodes 3 and the second electrodes 4 is stopped, in the left space 72, the electrophoretic particles 5 are maintained attracted to the second electrode 4 by an electrostatic force (attractive force) generated where the first electrode 3 and the second electrode 4 overlap with each other, and in the right space 72, the electrophoretic particles 5 are kept pushed toward the first electrode 3 by an electrostatic force (repulsive force) generated at a part where the first electrode 3 and the second electrode 4 are overlapped with each other.

Furthermore, in this electrophoretic device 20, the moving distance of the electrophoretic particles 5 between the second electrode 4 and the part of the first electrode 3 exposed from the second electrode 4 can be controlled by controlling the magnitude of the voltage applied to the electrodes 3 and 4, the time of the application of the voltage, and the like. As a result, a multistage gradation display can be realized. The electrophoretic device 20 of the fourth embodiment can also provide the same operation and advantages as those of the first, second, and third embodiments.

Electric Apparatus

The above-described electrophoretic device 20 can be installed in various types of electric apparatus. Electric apparatus of the invention including the electrophoretic device 20 will now be described.

Electronic Paper

Figure 9:
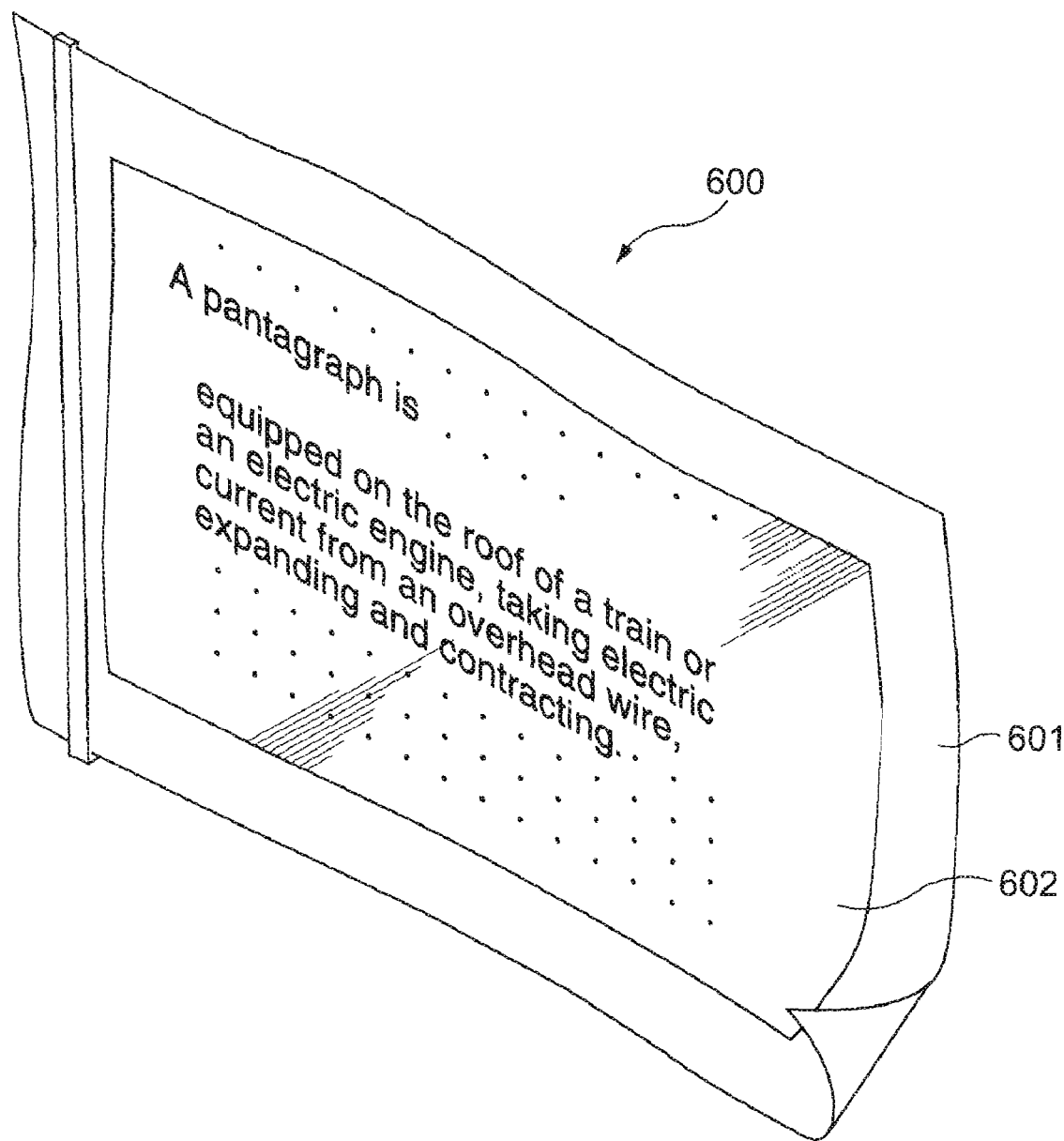
FIG. 9 is a perspective view showing an embodiment in the case where electric apparatus of the invention is applied to electronic paper.

An embodiment in the case where electric apparatus of the invention is applied to electronic paper will be described. FIG. 9 is a perspective view showing the embodiment in the case where electric apparatus of the invention is applied to electronic paper. Electronic paper 600 shown in FIG. 9 includes a main body 601 composed of a rewritable sheet having a texture and flexibility similar to those of paper, and a display unit 602. In the electronic paper 600, the display unit 602 is composed of the above-described electrophoretic device 20.

Display

Figure 10A:
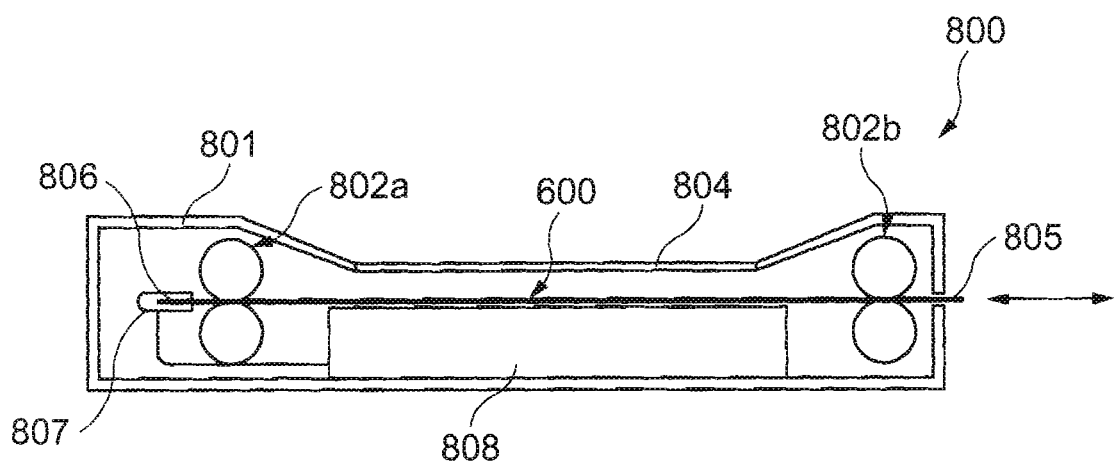
FIGS. 10A and 10B are views showing an embodiment in the case where electric apparatus of the invention is applied to a display.
Figure 10B:
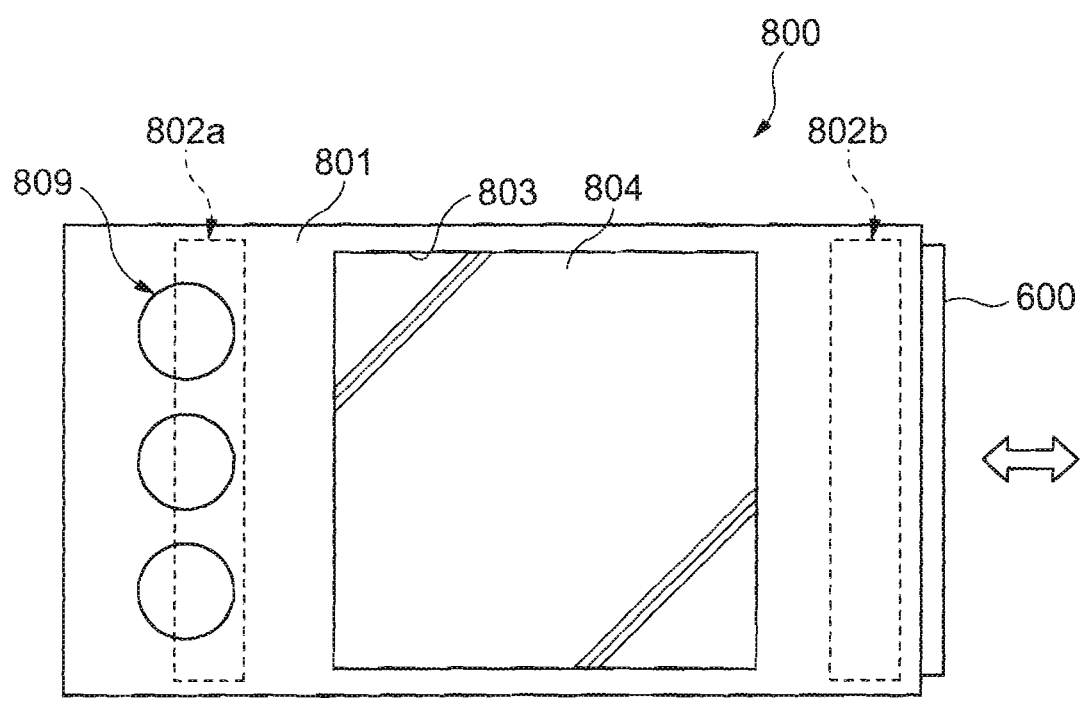

An embodiment in the case where electric apparatus of the invention is applied to a display will be described. FIGS. 10A and 10B are views showing the embodiment in the case where electric apparatus of the invention is applied to a display. FIG. 9A is a cross-sectional view and FIG. 10B is a plan view thereof. A display (display device) 800 shown in FIGS. 10A and 10B includes a main body section 801 and removable electronic paper 600 provided in the main body section 801. This electronic paper 600 has the same structure as that shown in FIG. 9.

The main body section 801 includes an inlet 805 provided in a side portion thereof (on the right side of FIGS. 10A and 10B), and two pairs of feed rollers 802a and 802b provided inside thereof. The electronic paper 600 can be inserted from the inlet 805. When the electronic paper 600 is inserted in the main body section 801 through the inlet 805, the electronic paper 600 is attached to the main body section 801 in a state where the electronic paper 600 is held by the pairs of feed rollers 802a and 802b therebetween.

The main body section 801 further includes a rectangular opening 803 provided on the display surface side thereof (on the near side of the drawing sheet of FIG. 10B). A transparent glass panel 804 is fitted in the opening 803. This structure allows the electronic paper 600 attached to the main body section 801 to be visible from the outside of the main body section 801. That is, according to this display 800, the electronic paper 600 attached to the main body section 801 is visually identified through the transparent glass panel 804, thereby forming the display surface.

The electronic paper 600 includes a terminal section 806 provided in a leading end in the insert direction of the electronic paper 600 (on the left side of FIGS. 10A and 10B) A socket 807 is provided inside the main body section 801. The terminal section 806 is connected to the socket 807 in a state where the electronic paper 600 is attached to the main body section 801. A controller 808 and an operating section 809 are electrically connected to the socket 807. In the display 800, the electronic paper 600 is removably attached to the main body section 801. Therefore, the electronic paper 600 can be detached from the main body section 801 and carried for use. In this display 803, the electronic paper 600 is composed of the electrophoretic device 20 described above.

The application of the electric apparatus of the invention is not limited to the above. Examples of the application include a television, viewfinder-type and direct-monitoring-type video tape recorders, a car navigation system, a pager, an electronic notebook, an electronic calculator, an electronic newspaper, a word processor, a personal computer, a workstation, a picture telephone, a POS terminal, and equipment with a touch panel. The electrophoretic device 20) of the invention can be applied to the display sections of the electric apparatus.

While the electrophoretic device and electric apparatus of the invention have been described on the basis of the embodiments shown in the drawings, the invention is not limited to these embodiments. The electrophoretic device of the invention may be a device produced by combining any two or more of structures (features) selected from the above-described embodiments.

EXAMPLES

Specific examples of the invention will now be described.

1. Preparation of Electrophoretic Particles

Example 1

[1] First titania particles (CR-90, manufactured by Ishihara Sangyo Kaisha Ltd.) having an average particle size of 0.3 μm were dispersed in water (polar dispersion medium) to prepare a dispersion liquid. The surfaces of the titania particles were positively charged.

[2] Subsequently, an anionic polymerizable surfactant (first polymerizable surfactant) represented by formula (38):

[Ch. 18]

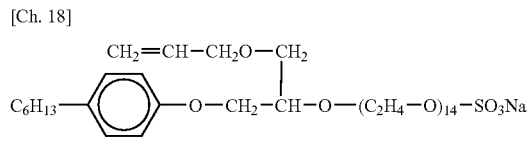

(38)

was added to the dispersion liquid. The dispersion liquid was stirred while ultrasonic irradiation was performed to prepare a mixture.

[3] Diallyldimethylammonium chloride (cationic second polymerizable surfactant) was then added to the mixture in equimolar amount relative to the anionic polymerizable surfactant. The resulting mixture was stirred while ultrasonic irradiation was performed to prepare an emulsion.

[4] Sodium persulfate (polymerization initiator) was then added to the emulsion and stirred the emulsion to prepare a mixture containing electrophoretic particles in which the peripheries of the titanic particles were coated with an organic polymer. In this step, the temperature was 70° C. and the stirring time was 5 hours.

[5] The electrophoretic particles were then recovered from the mixture by ultrafiltration.

[6] The resulting electrophoretic particles were dried under vacuum. The conditions for freeze drying were as follows.
Cooling temperature: −45° C.
Pressure: 9 Pa

Example 2

Electrophoretic particles were prepared as in Example 1 except that the anionic polymerizable surfactant represented by formula (38) was used instead of diallyldimethylammonium chloride.

Example 3

Electrophoretic particles were prepared as in Example 2 except that the anionic polymerizable surfactant represented by formula (38) was added in a molar amount two times the number of moles of the anionic polymerizable surfactant added in step [2].

Example 4

Electrophoretic particles were prepared as in Example 2 except that the anionic polymerizable surfactant represented by formula (39):

(39)

[Ch. 19]

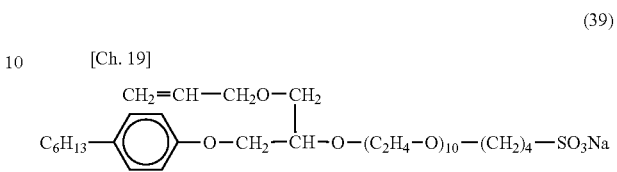

was used instead of the anionic polymerizable surfactant represented by formula (38).

Example 5

Electrophoretic particles were prepared as in Example 2 except that the anionic polymerizable surfactant represented by formula (40):

(40)

[Ch. 20]

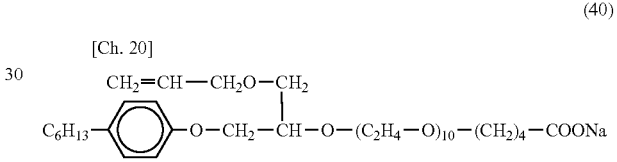

was used instead of the anionic polymerizable surfactant represented by formula (38).

Example 6

Electrophoretic particles were prepared as in Example 2 except that the anionic polymerizable surfactant represented by formula (41):

(41)

[Ch. 21]

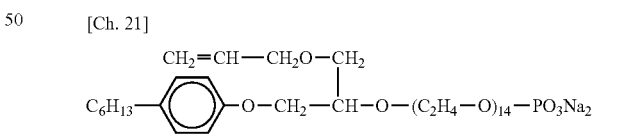

was used instead of the anionic polymerizable surfactant represented by formula (38).

Example 7

Electrophoretic particles were prepared as in Example 2 except that the anionic polymerizable surfactant represented by formula (42):

[Ch. 22]

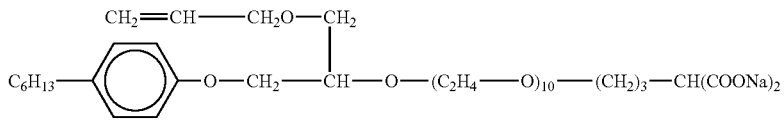

(42)

was used instead of the anionic polymerizable surfactant represented by formula (38).

2. Evaluation

The zeta potential of the surfaces of the electrophoretic particles prepared in the examples were measured. The results showed that the charge polarity of the electrophoretic particles of Example 1 was different from that of the electrophoretic particles of Examples 2 to 7. Specifically, the electrophoretic particles of Example 1 were positively charged whereas the electrophoretic particles of Examples 2 to 7 were negatively charged.

The amount of charge of the electrophoretic particles of Example 1 was different from that of the original titania particles. Furthermore, the amounts of charges of the electrophoretic particles of Examples 2 to 7 are also different from each other. These results showed that the charge polarity and the amount of charge of the resulting electrophoretic particles can be controlled by changing the polarity of the second polar group included in the second polymerizable surfactant added in step [3], and at least one of the number of the second polar groups in the second polymerizable surfactant, the composition of the second polar group, the valence of the second polar group, the molecular weight of the second polymerizable surfactant, and the molar amount of the second polymerizable surfactant added.

What is claimed is:

1. An electrophoretic particle, comprising:
a base particle; and
an organic polymer film;
the organic polymer film including a plurality of first polar groups, a plurality of second polar groups, and a polymerized film,
the plurality of the first polar groups being disposed between the base particle and the polymerized film,
the polymerized film being disposed between the plurality of first polar groups and the plurality of second polar groups.

2. The electrophoretic particle according to claim 1, further comprising:
a silicon oxide layer disposed between the base particle and the organic polymer film.

3. The electrophoretic particle according to claim 1,
the organic polymer film further including a plurality of first hydrophobic groups, and the polymerized film being connected to the plurality of first polar groups through the plurality of first hydrophobic groups.

4. The electrophoretic particle according to claim 1,
the organic polymer film further including a plurality of second hydrophobic groups, and the polymerized film being connected to the plurality of second polar groups through the plurality of second hydrophobic groups.

5. The electrophoretic particle according to claim 1, each of the plurality of first polar groups having a negative charge, and each of the plurality of second polar groups having a negative charge.

6. The electrophoretic particle according to claim 1, each of the plurality of first polar groups having a negative charge, and each of the plurality of second polar groups having a positive charge.

7. The electrophoretic particle according to claim 1, each of the plurality of first polar groups having a negative charge, and a positive charge against the negative charge being produced by a proton.

8. The electrophoretic particle according to claim 2,
each of the plurality of first polar groups having a negative charge, and
a positive charge against the negative charge being produced by a proton located between the silicon oxide layer and the polymerized film.

9. An electrophoretic device comprising:
a plurality of microcapsules, each of the microcapsules including the electrophoretic particle according to claim 1; and
a substrate on which the plurality of microcapsules is disposed.

10. An electric apparatus comprising:
the electrophoretic device according to claim 9; and
a main body section on which the electrophoretic device is disposed.

11. An electrophoretic particle, comprising:
a base particle; and
an organic polymer film;
the organic polymer film including a plurality of first polar groups, a plurality of hydrophobic groups, and a polymerized film,
the plurality of first polar groups being disposed between the base particle and the polymerized film, and
the polymerized film being disposed between the plurality of first polar groups and the plurality of hydrophobic groups.

12. The electrophoretic particle according to claim 11, each of the plurality of first polar groups having a negative charge.

13. The electrophoretic particle according to claim 11, each of the plurality of first polar groups having a negative charge, and a positive charge against the negative charge being produced by a proton.

14. The electrophoretic particle according to claim 11, further comprising: a silicon oxide layer disposed between the base particle and the organic polymer film, and a positive charge against the negative charge being produced by proton located between the silicon oxide layer and the polymerized film.

* * * * *